US010586434B1

(12) United States Patent
Siminoff

(10) Patent No.: US 10,586,434 B1
(45) Date of Patent: Mar. 10, 2020

(54) PREVENTING UNAUTHORIZED ACCESS TO AUDIO/VIDEO RECORDING AND COMMUNICATION DEVICES

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/169,485

(22) Filed: Oct. 24, 2018

Related U.S. Application Data

(60) Provisional application No. 62/576,713, filed on Oct. 25, 2017.

(51) Int. Cl.
| | | |
|---|---|---|
| *G08B 13/196* | (2006.01) | |
| *G06F 9/50* | (2006.01) | |
| *G06F 16/903* | (2019.01) | |
| *G06F 9/54* | (2006.01) | |
| *H04L 29/06* | (2006.01) | |

(52) U.S. Cl.
CPC ..... *G08B 13/19684* (2013.01); *G06F 9/5027* (2013.01); *G06F 9/542* (2013.01); *G06F 16/90335* (2019.01); *H04L 63/0876* (2013.01); *H04L 63/102* (2013.01); *H04L 63/107* (2013.01)

(58) Field of Classification Search
CPC ......... G08B 13/19684; G06F 16/90335; G06F 9/542; G06F 9/5027; H04L 63/102; H04L 63/107; H04L 63/0876
See application file for complete search history.

(56) References Cited

U.S. PATENT DOCUMENTS

| | | | |
|---|---|---|---|
| 8,396,265 B1 * | 3/2013 | Ross ................... | G06K 9/00214 382/103 |
| 9,300,921 B2 | 3/2016 | Naidoo et al. | |
| 2006/0111125 A1 * | 5/2006 | Karaoguz ............. | H04L 63/083 455/456.2 |
| 2006/0253251 A1 * | 11/2006 | Puranik .............. | G01C 21/3608 701/431 |
| 2014/0031992 A1 | 1/2014 | Bergman et al. | |
| 2016/0105644 A1 * | 4/2016 | Smith ................ | H04N 5/23206 348/159 |

* cited by examiner

*Primary Examiner* — Farzana Hossain
(74) *Attorney, Agent, or Firm* — Greenberg Traurig, LLP

(57) ABSTRACT

Access by a client device to a live video stream of an audio/video (A/V) recording and communication device installed at a location may be granted or denied based on the armed state of a security system deployed at the location and the active state of the A/V recording and communication device.

13 Claims, 13 Drawing Sheets

PREVENTING UNAUTHORIZED ACCESS TO AUDIO/VIDEO RECORDING AND COMMUNICATION DEVICES

CROSS-REFERENCE TO RELATED APPLICATION

This application claims the benefit of priority to U.S. provisional application No. 62/576,713, filed on Oct. 25, 2017, the entire contents of which are hereby incorporated by reference.

FIELD OF THE DISCLOSURE

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/video (A/V) recording and communication devices, such as surveillance cameras, whether alone or integrated with other devices such as doorbells or lighting fixtures, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present invention for preventing unauthorized access to audio/video (A/V) recording and communication devices now will be discussed in detail with an emphasis on highlighting the advantageous features. These embodiments depict the novel and non-obvious aspects of preventing unauthorized access to audio/video (A/V) recording and communication devices shown in the accompanying drawings, which are for illustrative purposes only. These drawings include the following figures, in which like numerals indicate like parts.

DETAILED DESCRIPTION

The following detailed description describes the present embodiments with reference to the drawings. Example methods, apparatuses, and systems described herein are not intended to limit the scope of the description to the precise form or forms detailed herein. Instead the following description is intended to be illustrative so that others may follow its teachings.

Various aspects of the present disclosure provide architecture and methodology for preventing unauthorized access to A/V recording and communication devices. Some embodiments may grant or deny access to a live video stream of an A/V recording and communication device depending on the states of the A/V recording and communication device and a security system associated with the A/V recording and communication device. For example, such embodiments may deny access to the live stream of an interior A/V recording and communication device (or a device designated as such) in instances where it is likely that someone is home, such as when the security system is in a disarmed state or when the security system is in an "armed stay" state in which the interior A/V recording and communication devices are in an inactive state.

Some embodiments may grant or deny access to an A/V recording and communication device based on the location of the A/V recording and communication device or based on an amount of time that has passed since the device's last network connection. For example, if a new user (e.g., a hacker) is attempting to gain access to the A/V recording and communication device, the device and/or backend system may first check the physical location of the device, and if the device did not move more than a threshold distance, then the access request may be denied. Such a distinction based on distance moved would help differentiate between unauthorized hackers, who are unlikely to move the device, and authorized new owners, who are likely to relocate the device to a distinct address. Alternatively, or in addition to the foregoing, if a new user is attempting to gain access to the A/V recording and communication device, the device and/or backend system may first check how long it has been since the device last had a network connection, and if the time since the last network connection is less than a threshold time (e.g., 3 days), then the access request may be denied. Such a distinction based on the time since the last network connection would similarly help differentiate between unauthorized hackers or thieves, who are unlikely to wait an appreciable time before attempting to set up the device, and authorized new owners, for whom it is likely to take some time to transition the device and any associated account.

Figure 1:
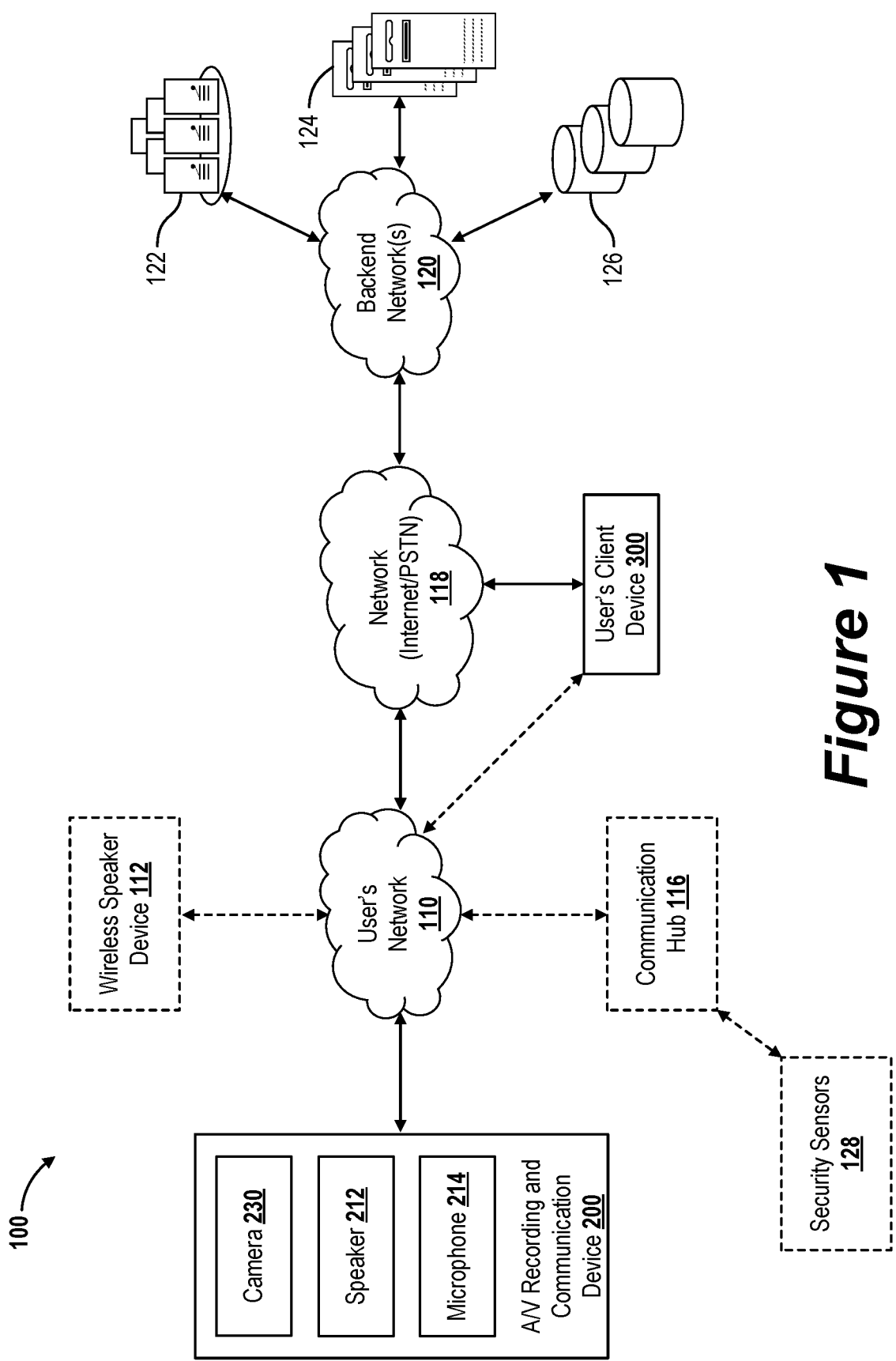
FIG. 1 is a functional block diagram illustrating a system for streaming and storing A/V content captured by an audio/video (A/V) recording and communication device according to various aspects of the present disclosure.

FIG. 1 discloses an example system 100 of the present disclosure. The system includes an audio/video (A/V) recording and communication device 200, which includes a camera 230, a speaker 212, and a microphone 214, among other components. An example A/V recording and communication device is shown and described in more detail with respect to FIG. 2.

While the present disclosure provides numerous examples of methods and systems including A/V recording and communication doorbells, the present embodiments are equally applicable for A/V recording and communication devices 200 other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components. An example A/V recording and communication security camera may further omit other components. In another example, the present embodiments may include one or more A/V recording and communication floodlight controllers instead of, or in addition to, one or more A/V recording and communication doorbells.

The A/V recording and communication device 200 may be located near the entrance to a structure (not shown), such as a dwelling, a business, a storage facility, etc. The A/V recording and communication device 200 includes a camera 230, a speaker 212, and a microphone 214. The camera 230 may comprise, for example, a high definition (HD) video camera, such as one capable of capturing video images at an image display resolution of 720p, 1080p, 2120p, or any other image display resolution. While not shown, the A/V recording and communication device 200 may also include other hardware and/or components, such as a housing, a communication module (which may facilitate wired and/or wireless communication with other devices), one or more motion sensors (and/or other types of sensors), a button, etc. The A/V recording and communication device 200 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth herein.

With further reference to FIG. 1, the A/V recording and communication device 200 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 may be connected to another network 118, which may comprise, for example, the Internet and/or a public switched telephone network (PSTN). As described below, the A/V recording and communication device 200 may communicate with the user's client device 300 via the user's network 110 and, optionally, the network 118 (Internet/PSTN). The user's client device 300 may comprise, for example, a mobile telephone (which may also be referred to as a cellular telephone), such as a smartphone, a personal digital assistant (PDA), or another communication device. The user's client device 300 comprises a display (not shown) and related components capable of displaying streaming and/or recorded video images. The user's client device 300 may also comprise a speaker and related components capable of broadcasting streaming and/or recorded audio, and may also comprise a microphone.

The A/V recording and communication device 200 may also communicate, via the user's network 110 and the network 118 (Internet/PSTN), with a backend network(s) 120 of servers and/or backend devices, such as (but not limited to) one or more remote storage devices 126 (which may be referred to interchangeably as "cloud storage device(s)"), one or more backend servers 124, and one or more backend APIs 122. While FIG. 1 illustrates the storage device 126, the server 124, and the backend API 122 as components separate from the network 120, it is to be understood that the storage device 126, the server 124, and/or the backend API 122 may be considered to be components of the network 120.

The network 118 may be any wireless network or any wired network, or a combination thereof, configured to operatively couple the above-mentioned modules, devices, and systems as shown in FIG. 1. For example, the network 118 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (who may be referred to interchangeably as "visitor," "intruder," "burglar," or other terms) arrives at the A/V recording and communication device 200, the A/V recording and communication device 200 detects the visitor's presence and begins capturing video images within a field of view of the camera 230. The A/V communication device 200 may also capture audio through the microphone 214. The A/V recording and communication device 200 may detect the visitor's presence by detecting motion using the camera 230 and/or a motion sensor, and/or by detecting that the visitor has pressed a front button of the A/V recording and communication device 200 (if the A/V recording and communication device 200 is a doorbell).

In response to the detection of the visitor, the A/V recording and communication device 200 may send an alert to the user's client device 300 (FIG. 1) via the user's network 110 and the network 118. The A/V recording and communication device 200 also sends streaming video, and may also send streaming audio, to the user's client device 300. If the user answers the alert, two-way audio communication may then occur between the visitor and the user through the A/V recording and communication device 200 and the user's client device 300. The user may view the visitor throughout the duration of the call, but the visitor cannot see the user (unless the A/V recording and communication device 200 includes a display, which it may in some embodiments).

The video images captured by the camera 230 of the A/V recording and communication device 200 (and the audio captured by the microphone 214) may be uploaded to the cloud and recorded on the remote storage device 126 (FIG. 1). In some embodiments, the video and/or audio may be recorded on the remote storage device 126 even if the user chooses to ignore the alert sent to the client device 300.

With further reference to FIG. 1, the system 100 may further comprise a backend API 122 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicates with one another using their public APIs. In some embodiments, the API backend may hold the bulk of the user data and offer the user management capabilities, leaving the clients to have very limited state.

The backend API 122 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 122 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

In some embodiments, the system 100 of FIG. 1 also includes a wireless speaker device 112. The wireless speaker device 112 may be capable of communicating over one or more networks. When connected to the user's network 110, the wireless speaker device 112 may serve to produce an audible sound responsive to the A/V recording and communication device 200 receiving an input (e.g., a visitor pressing the doorbell button on the A/V recording and communication device 200).

The wireless speaker device 112 may connect to the user's network 110 via Wi-Fi, in one aspect of the present disclosure. The wireless speaker device 112 may also communicate directly with, and communicate with other devices via, the communication hub 116. Other communication protocols and/or standards may also be used. The wireless speaker device 112 may be a stand-alone product or component capable of emitting an audible sound, amongst other functions, to a user within audible range of the wireless speaker device 112.

In an example operation, a user pressing a button on the A/V recording and communication device 200 causes the transmission of a message or signal to a computing device over a network. That computing device may then echo that message, or transmit a different message, to the wireless speaker device 112. That message may, among other things, include instructions that cause the wireless speaker device to produce one or more audible sounds. Other example wireless speaker devices may be described in greater detail below.

In some embodiments, the system 100 further includes communicatively coupled thereto a communication hub 116. The communication hub may be capable of communicating directly (e.g., via Wi-Fi Direct, Bluetooth, Zigbee, etc.) and/or via the user's network 110, with the A/V recording and communication device 200, the client device 300, the wireless speaker 112, other devices present within the user's home, and other devices across the Internet network 118.

In some implementations, the communication hub 116 is a "smart" hub capable of facilitating communication among two or more devices across a network. For example, the communication hub 116 may relay information between the A/V recording and communication device 200 and the user's client device 300, to facilitate bidirectional audio transmissions therebetween (e.g., establishing two-way audio communication between a visitor at the A/V recording and communication device 200 and the user's client device 300) without the need of a backend server device.

The communication hub 116 may also provide device internetworking functionality, allowing one device to communicate to another device without a separate backend server or computing device. For instance, two A/V recording and communication devices 200 (e.g., one at the front door and one at the back door of a user's home) may communicate to one another through the communication hub 116. One A/V recording and communication device 200 may, upon experiencing a triggering event, broadcast a message to other A/V recording and communication devices 200 in the user's network 110, instructing them to carry out some action. In this manner, device-to-device cooperation may be achieved, without requiring backend server interaction (although, backend server communication may also occur).

In an embodiment, the A/V recording and communication device 200 and communication hub 116 may be provided as part of a broader home or premises security system. In such an embodiment, the system 100 may further include one or more security sensors 128. The security sensors 128 may include, for example, door open sensors, motion sensors, glass break sensors, and the like. In such an embodiment, the communication hub 116 may further act as a control system for the security sensors 128 and may activate and deactivate the security sensors 128, may send alerts to the user client device 300 responsive to data from the security sensors 128 (e.g., data indicative of an intrusion), may output alerts to a monitoring service or monitoring center responsive to data from the security sensors 128, and/or may trigger an audible or other alarm (e.g., on the wireless speaker device 112) responsive to data from the security sensors 128. In an embodiment, the communication hub 116 may be configured to alter a state of the security system. For example, the communication hub may be configured to alter the state of the security system from an unarmed state, in which data from the security sensors 128, such as data indicative of a door or window being opened, is not indicative of an intrusion, to an armed state, in which data from one or more of the security sensors 128 is indicative of an intrusion.

Figure 2:
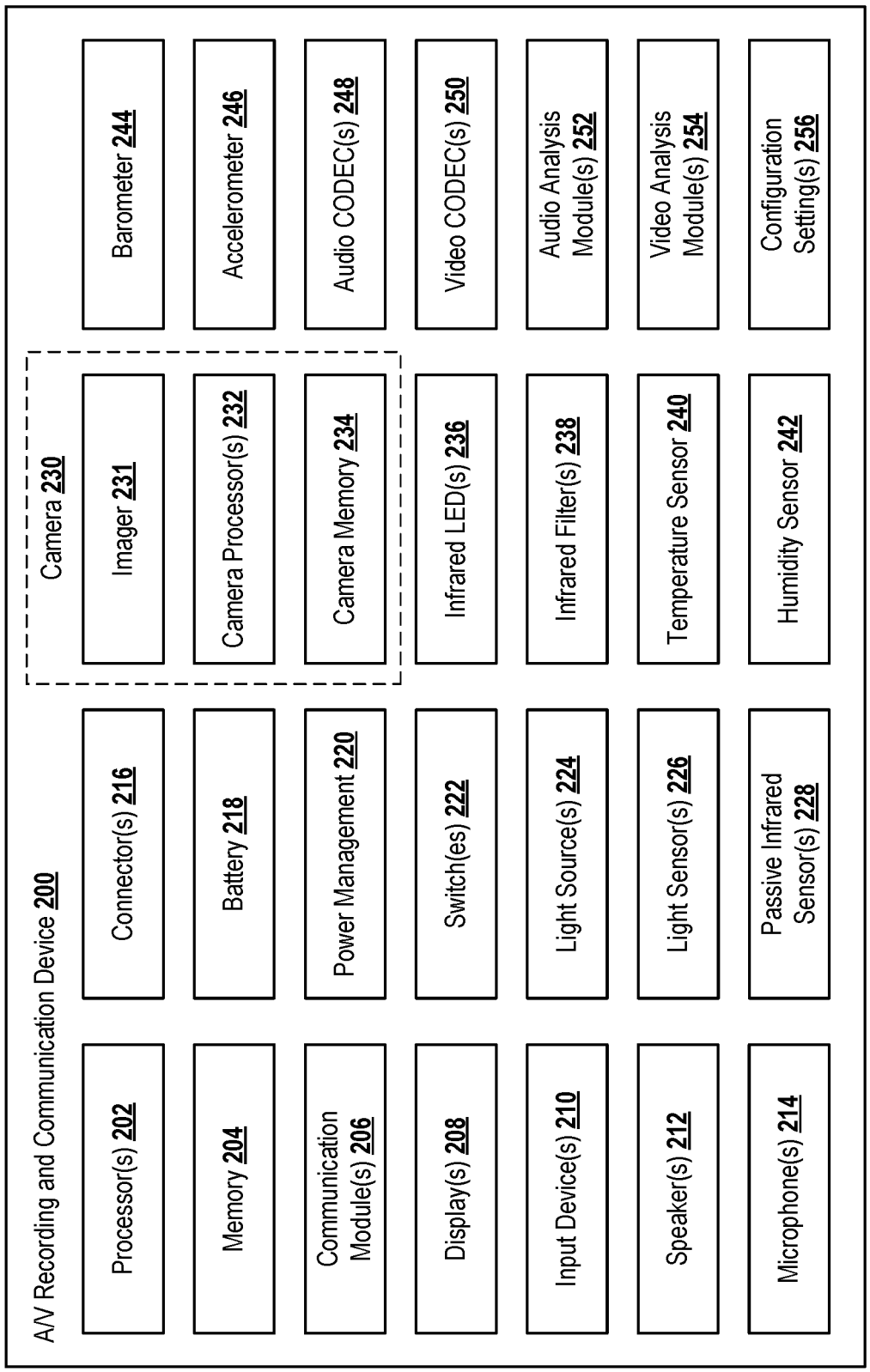
FIG. 2 is a functional block diagram of the components of the A/V recording and communication device of FIG. 1 according to various aspects of the present disclosure.

FIG. 2 is a functional block diagram of the components within or in communication with, an example audio/video (A/V) recording and communication device 200, according to an aspect of the present embodiments. The A/V recording and communication device 200 may include an accelerometer 246, a barometer 244, a humidity sensor 242, and a temperature sensor 240, which may collectively be embodied in a bracket printed circuit board (PCB), in various embodiments. The accelerometer 246 may be one or more sensors capable of sensing motion and/or acceleration. The barometer 244 may be one or more sensors capable of determining the atmospheric pressure of the surrounding environment in which the bracket PCB may be located. The humidity sensor 242 may be one or more sensors capable of determining the amount of moisture present in the atmospheric environment in which the bracket PCB may be located. The temperature sensor 240 may be one or more sensors capable of determining the temperature of the ambient environment in which the A/V recording and communication device 200 may be located. In some embodiment, the bracket PCB or other implementation of the accelerometer 246, a barometer 244, a humidity sensor 242, and/or temperature sensor 240 may be located outside the housing of the A/V recording and communication device 200 so as to reduce interference from heat, pressure, moisture, and/or other stimuli generated by the internal components of the A/V recording and communication device 200.

The A/V recording and communication device 200 may also comprise a light sensor(s) 226, one or more light sources 224, such as LEDs, one or more speaker(s) 212, and a microphone(s) 214, one or more of which may be implemented on a front PCB, in some embodiment. The light sensor(s) 226 may be one or more sensors capable of detecting the level of ambient light of the surrounding environment in which the A/V recording and communication device 200 may be located. The speaker(s) 212 may be any electromechanical device capable of producing sound in response to an electrical signal input. The microphone(s) 214 may include an acoustic-to-electric transducer or sensor capable of converting sound waves into an electrical signal.

The speaker(s) 212 and the microphone(s) 214 may be coupled to the camera processor 232 through one or more audio CODECs 248. For example, the transfer of digital audio from the user's client device 300 and the speaker(s) 212 and the microphone(s) 214 may be compressed and decompressed using the audio CODEC(s) 248, coupled to the camera processor 232. Once compressed by audio CODEC(s) 248, digital audio data may be sent through a communication module 206 to the network 118, routed by the one or more servers 124, and delivered to the user's client device 300. When the user speaks, after being transferred through the network 118, digital audio data is decompressed by audio CODEC(s) 248 and emitted to the visitor via the speaker(s) 212.

The A/V recording and communication device 200 may further include one or more video CODECs 250 and/or software instructions to leverage video CODEC(s) 250 for the purposes of compression and/or decompression of images and/or videos. In an example operation, the imager 231 captures light from a scene, which is then interpreted and processed by one or more camera processors 232 to convert captured light signals into raw image/video data. The camera processor(s) 232 and/or processor(s) 202 may then compress that raw image/video data using one or more video CODEC(s) 250, to reduce the amount of data stored or transmitted by the A/V recording and communication device 200. Any combination of known video CODECs may be included within video CODEC(s) 250. In some embodiments, video CODEC(s) 250 alternatively or additionally includes special purpose or proprietary video CODEC(s).

With further reference to FIG. 2, the A/V recording and communication device 200 may further include a power management module 220, a processor(s) 202 (which may also be referred to as "microcontroller," "CPU," or "controller"), the communication module 206, and memory 204, one or more of which may be implemented on a main PCB or power PCB, in various embodiments. In certain embodiments, the power management module 220 may comprise an integrated circuit capable of arbitrating between multiple voltage rails, thereby selecting a source of power for the A/V recording and communication device 200. The battery 218 and/or the connector(s) 216 may each provide power to the power management module 220. The power management module 220 may have separate power rails dedicated to the battery 218 and the connector(s) 216. The power management module 220 may also serve as a conduit for data between the connector(s) 216 and the processor(s) 202.

The connector(s) 216 may be electrically coupled with an AC/DC adapter, in some embodiments. The A/V recording and communication device 200 may thus be configured to connected to a source of external AC (alternating-current) power, such as a household AC power supply (which may also be referred to as AC mains). The AC power supply may provide a voltage in the range of 110-220 VAC, for example. The incoming AC power may be received at the connector(s) 216 from an AC/DC adapter, which may convert the incoming AC power to DC (direct-current) and may step down the voltage from 110-220 VAC to a lower output voltage of about 12 VDC and an output current of about 2 A, for example. In various embodiments, the output of an AC/DC adapter may be in a range of from about 9V to about 15V, for example, and in a range of from about 0.5 A to about 5 A, for example. These voltages and currents are only examples provided for illustration and are not limiting in any way.

With further reference to FIG. 2, in certain embodiments the processor(s) 202 may comprise an integrated circuit including a processor core, memory, and programmable input/output peripherals. The processor(s) 202 may receive input signals, such as data and/or power, from the passive infrared sensor(s) 228, the bracket PCB, the power management module 220, the light sensor(s) 226, the microphone(s) 214, and/or the communication module 206, and may perform various functions as further described below. When the processor(s) 202 is triggered by the passive infrared sensor(s) 228, the processor(s) 202 may be triggered to perform one or more functions. When the light sensor(s) 226 detects a low level of ambient light, the light sensor(s) 226 may trigger the processor(s) 202 to enable "night vision," as further described below. The processor(s) 202 may also act as a conduit for data communicated between various components and the communication module 206.

The display(s) 208 may be any electronic video display, such as a liquid-crystal display (LCD). The display(s) 208 may permit the A/V recording and communication device 200 to show information to visitors, output status information of the A/V recording and communication device 200 for users, and/or otherwise serve to communicate information to people (e.g., display a message to a hearing-impaired visitor). In some implementations, the display(s) 208 include embedded therein a digitizer, capacitive layer, or a resistive layer that allows the display(s) 208 to act as a touchscreen.

The input device(s) 210 may be any kind of human interface device (HID) that receives input from a user and translates that input into computer-understandable information. Some example input units include a keyboard, a mouse, a touchpad, and/or a touchscreen, among other possible input devices. In some instances, the input device(s) 210 may refer to an on-screen keyboard or pointer device of a touchscreen. A user may interact with input device(s) 210 to enter a text input, and/or press a button (physical or virtual), which may trigger execution of a command. Regardless of the kind of input device used, the input device(s) 210 may provide an interface through which a user can interact with A/V recording and communication devices of the present application.

For example, in certain embodiments the camera memory 234 may comprise synchronous dynamic random access memory (SD RAM). Infrared LED(s) 236 may comprise light-emitting diodes capable of radiating infrared light. Infrared filter(s) 238 may comprise a system that, when triggered, configures the imager 230 to see primarily infrared light as opposed to visible light. When the light sensor(s) 226 detects a low level of ambient light (which may comprise a level that impedes the performance of the imager 230 in the visible spectrum), the infrared LED(s) 236 may shine infrared light through the A/V recording and communication device 200 enclosure out to the environment, and the infrared filter(s) 238 may enable the imager 230 to see this infrared light as it is reflected or refracted off of objects within the field of view of the A/V recording and communication device 200. This process may provide the A/V recording and communication device 200 with the "night vision" function mentioned above.

With further reference to FIG. 2, the communication module 206 may comprise an integrated circuit including processor core(s), memory, and programmable input/output peripherals. The communication module 206 may also be configured to transmit data wirelessly to a remote network device, and may include one or more transceivers (not shown). The communication module 206 may enable wireless communication through one or more wireless networks, such as, without limitation, Wi-Fi, cellular, Bluetooth, and/or satellite networks. The communication module 206 may receive inputs, such as power and/or data, from the camera PCB, the processor(s) 202, input device(s) 210 including buttons, and/or the power PCB memory 204. When one or more buttons are pressed, the communication module 206 may be triggered to perform one or more functions. When the reset button is pressed, the communication module 206 may be triggered to erase any data stored at the power PCB memory 204 and/or at the camera memory 234. The communication module 206 may also act as a conduit for data communicated between various components and the processor(s) 202. The power PCB memory 204 may comprise flash memory configured to store and/or transmit data. For example, in certain embodiments the power PCB memory 204 may comprise serial peripheral interface (SPI) flash memory.

In some embodiments, the A/V recording and communication device 200 includes switch(es) 222, which can selectively couple and decouple two or more electric terminals. For instance, switch(es) 222 may include a switch—controlled by processor(s) 202 or another component of the A/V recording and communication device 200—that serves to couple and decouple a light source with a power source. As a specific example, switch(es) 222 may include a relay that, when activated, energizes a flood light. Switch(es) 222 may include relays, transistors, manual switches, and/or some combination thereof.

Light source(s) 224 may include any type of light bulb, light emitting diode (LED), LASER, or other light source of any wavelength or combination of wavelengths. In some embodiments, light source(s) 224 includes infrared LEDs to provide non-human-detectable illumination of a scene, enabling a "night vision" function of the A/V recording and communication device 200. Other light source(s) 224 may provide information to a user or visitor (e.g., indicators for charging, recording, etc.). Some light source(s) 224 may serve as an alert or visual siren (e.g., alternating flashing LEDs). Any combination of light sources may be included within light source(s) 224 without departing from the scope of the present application.

The A/V recording and communication device 200 may include functionality for the local processing of information, without the need of a server or backend computing device. In some embodiments, the A/V recording and communication device 200 includes audio analysis module(s) 252, video analysis module(s) 254, and configuration settings 256, among other special purpose software units. Each of these modules may be stored as instructions and/or data on a memory device of the A/V recording and communication device 204, such as memory 204, EEPROMs, and/or other non-volatile memory thereon. The specific configuration and software used to instantiate these modules may be modifiable and updateable (e.g., be updated from a remote computing device over a network).

The audio analysis module(s) 252 may be operable to analyze audio signals or digital audio data to extract or quantify qualities of those audio signals or digital audio data. In some cases, the audio analysis module(s) 252 might include analog electrical analysis prior to digitizing audio signals. As one example, audio analysis module(s) 252 may include analog filters (e.g., low-pass filters, high-pass filters, band-pass filters, etc.), which can isolate a particular range of frequencies within an audio signal prior to being digitized. Such analog filters may reduce latency and/or computational complexity required to perform spectral analysis.

The audio analysis module(s) 252 may also include one or more digital analysis modules. Such modules—which might use known audio analysis techniques and/or proprietary techniques described in greater detail herein—may conduct spectral analyses, statistical analyses (e.g., amount of randomness), or amplitude determinations (e.g., relative volume of a sound), among other analyses. Higher level functions may also be implemented within audio analysis module(s) 252. For instance, the audio analysis module(s) 252 may carry out pattern detection, pattern matching, speech detection, speaker identification, and/or other proprietary sound detection, which may be described in greater detail below.

The video analysis module(s) 254 may be configured to analyze images and/or video data to identify the contents of images/video, classify portions of images/videos with some label, and/or otherwise derive information from images and/or video for subsequent use thereof. For example, a particular triggering event (e.g., sounding an alarm) may occur based on the detection of a particular object within an image or video feed. Video analysis module(s) 254 provide image and video analysis tools that enable the A/V recording and communication device to perform local processing of captured images without the need for backend processing. Such "onboard" video processing may be preferred over backend processing in circumstances where transmission latency over a wide area network would substantially reduce the efficacy of a particular method. The video analysis module(s) 254 may generally perform "computer vision" operations, including known techniques and/or novel techniques as described herein.

In some cases, the audio analysis module(s) 252 and the video analysis module(s) 254 may include software libraries, circuits, CODECs, classifiers, filters, machine learning tools, and/or other modules that are commonly used in audio and/or video processing. In other cases, the audio analysis module(s) 252 and/or video analysis module(s) 254 are proprietary software and/or hardware modules that carry out application-specific audio/video analyses. For example, a particular module may be a classifier that determines whether a video frame represents a daytime scene or a nighttime scene. Such specific audio/video classifiers, models, or modules may be described in greater detail below.

The audio analysis module(s) 252 and the video analysis module(s) 254 may further include modules for compressing audio and/or video data. For instance, an audio segment may be compressed by reducing the bitrate of that audio segment, thereby shrinking the amount of data representing that audio segment at the cost of audio quality. Likewise, a video clip may be compressed by reducing a video clip's resolution and/or its per-pixel bitrate (e.g., color depth). In other cases, a video clip might be compressed using "P-frame" or "delta-frame" techniques, in which only changes between successive video frames are encoded. Any type of audio/video compression techniques may be employed on the A/V recording and communication device 200 without departing from the scope of the present disclosure.

The A/V recording and communication device 200 may also thereon include configuration setting(s) 256. In some embodiments, the configuration setting(s) 256 represent the "state" of the A/V recording and communication device 200. For example, the A/V recording and communication device 200 may be placed into an "armed" mode when its owner is away from home. A configuration file, flag, or the like may be modified, which might affect some aspects of the A/V recording and communication device's 200 operation. For instance, an A/V recording and communication device 200 in "armed" mode may produce a siren sound in response to a triggering event, which would not otherwise occur if the A/V recording and communication device 200 was not in the "armed" mode.

The configuration setting(s) 256 may also represent a particular configuration, parameters, weightings, or other settings of a quantitative model, classifier, machine learning algorithm, or the like. As one example, a support vector machine (SVM) may be represented as a hyperplane that divides two regions of vector space into two respective classifications. The coefficients defining the hyperplane may be included within the configuration setting(s) 256. As another example, an artificial neural network (ANN) may comprise a set of interconnected nodes, with specific weights between each node connection. These connection weights may also be included within the configuration setting(s) 256.

The A/V recording and communication device 200 may carry out methods for detecting a particular audio event or a particular object within a video frame. In some implementations, the A/V recording and communication device 200 includes a classifier or machine learning algorithm that is executed locally on processor(s) 202. The parameters or weightings of the classifier or machine learning algorithm—that is, configuration setting(s) 256—may be updated (e.g., received from a computing device via the communication module(s) 206). Thus, the configuration setting(s) 256 may include parameters, coefficients, or weightings that enable or improve the audio analysis module(s) 252 and the video analysis module(s) 254 to carry out particular tasks, as may be described in greater detail herein.

In some cases, various embodiments of the processor(s) 202 and/or memory 204 may include thereon instructions that, upon execution, implement computer vision and/or image or video analysis functions. Alternatively or additionally, the A/V recording and communication device 200 might include one or more integrated circuits in communication with the processor(s) 202 to carry out aspects of computer vision functions, such as object recognition, image or video compression, and/or face detection, among other functions.

Additionally or alternatively, the A/V recording and communication device 200 may also transmit captured audio/video to a computing device, such as a backend server, over a network for subsequent processing thereof. Such a backend server may, in some cases, conduct audio, image, and/or video analyses to determine the presence or absence of some object or event. If a detection is made, the backend server may then transmit messages to the A/V recording and communication device 200, a client device 300, and/or other devices. In some instances, transmitted audio/video may be stored in a storage device (e.g., in a database), to serve as training data for the purpose of generating and/or improving a classifier or machine learning tool.

With further reference to FIG. 2, the A/V recording and communication device 200 may comprise components that facilitate the operation of a camera. For example, an imager 230 may comprise a video recording sensor and/or a camera chip. In one aspect of the present disclosure, the imager 230 may comprise a complementary metal-oxide semiconductor (CMOS) array, and may be capable of recording high definition (e.g., 720p, 2120p, etc.) video files. A camera processor 232 may comprise an encoding and compression chip. In some embodiments, the camera processor 232 may comprise a bridge processor. The camera processor 232 may process video recorded by the imager 230 and audio recorded by the microphone(s) 214, and may transform this data into a form suitable for wireless transfer by the communication module 206 to a network. The camera memory 234 may comprise volatile memory that may be used when data is being buffered or encoded by the camera processor 232. For example, in certain embodiments the camera memory 234 may comprise synchronous dynamic random access memory (SD RAM). Infrared LED(s) 236 may comprise light-emitting diodes capable of radiating infrared light. Infrared filter(s) 238 may comprise a system that, when triggered, configures the imager 230 to see primarily infrared light as opposed to visible light. When the light sensor(s) 226 detects a low level of ambient light (which may comprise a level that impedes the performance of the imager 230 in the visible spectrum), the Infrared LED(s) 236 may shine infrared light through the A/V recording and communication device 200 enclosure out to the environment, and the Infrared filter(s) 238 may enable the imager 230 to see this infrared light as it is reflected or refracted off of objects within the field of view of the doorbell. This process may provide the A/V recording and communication device 200 with the "night vision" function mentioned above.

Figure 3:
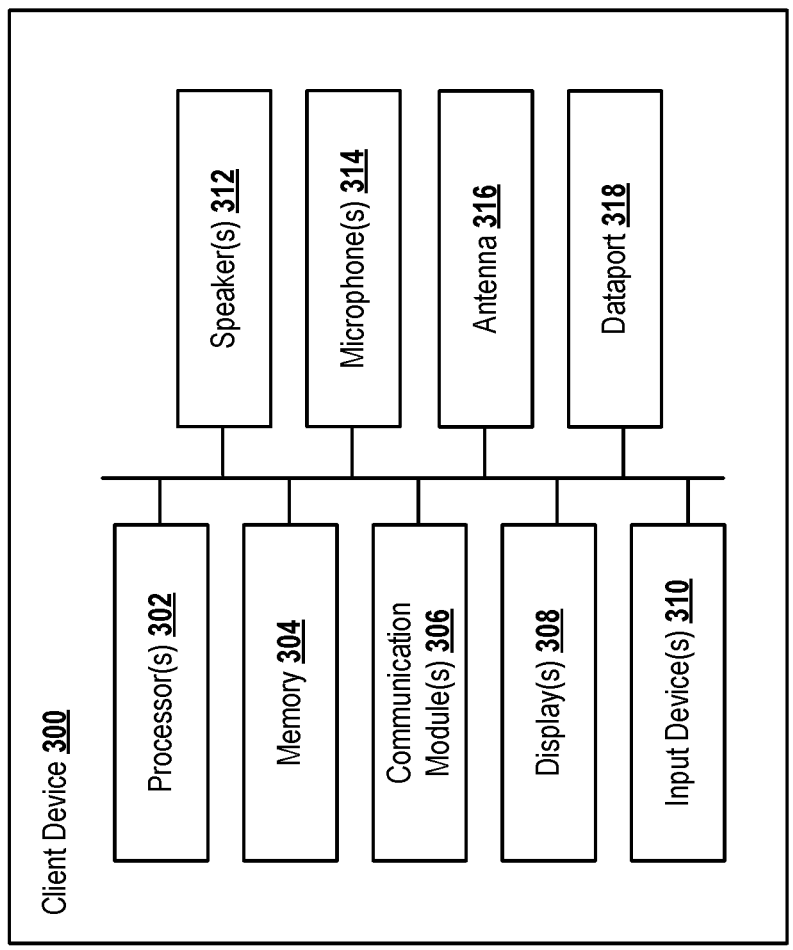
FIG. 3 is a functional block diagram of a client device on which the present embodiments may be implemented according to various aspects of the present disclosure.

FIG. 3 is a functional block diagram of an example client device 300 on which the present embodiments may be implemented according to various aspects of the present disclosure. The user's client device 300 described with reference to FIG. 1 may include some or all of the components and/or functionality of the client device 300 illustrated in FIG. 3. The client device 300 may comprise, for example, a smartphone.

With reference to FIG. 3, the example client device 300 includes a processor(s) 302, a memory 304, a display(s) 308, a communication module(s) 306, input device(s) 310, speaker(s) 312, microphone(s) 314, connector(s) 316, battery 318, and a dataport 318. These components are communicatively coupled together by an interconnect bus. The processor(s) 302 may include any processor used in smartphones and/or portable computing devices, such as an ARM processor (a processor based on the RISC (reduced instruction set computer) architecture developed by Advanced RISC Machines (ARM).). In some embodiments, the processor(s) 302 may include one or more other processors, such as one or more conventional microprocessors, and/or one or more supplementary co-processors, such as math co-processors.

The memory 304 may include both operating memory, such as random access memory (RAM), as well as data storage, such as read-only memory (ROM), hard drives, flash memory, or any other suitable memory/storage element. The memory 304 may include removable memory elements, such as a CompactFlash card, a MultiMediaCard (MMC), and/or a Secure Digital (SD) card. In some embodiments, the memory 304 may comprise a combination of magnetic, optical, and/or semiconductor memory, and may include, for example, RAM, ROM, flash drive, and/or a hard disk or drive. The processor(s) 302 and the memory 304 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor(s) 302 may be connected to the memory 304 via the dataport 318.

The display(s) 308 may include any user interface or presentation elements suitable for a smartphone and/or a portable computing device, such as a keypad, a display screen, a touchscreen, a microphone, and a speaker. The communication module(s) 306 is configured to handle communication links between the client device 300 and other, external devices or receivers, and to route incoming/outgoing data appropriately. For example, inbound data from the dataport 318 may be routed through the communication module(s) 306 before being directed to the processor(s) 302, and outbound data from the processor(s) 302 may be routed through the communication module(s) 306 before being directed to the dataport 318. The communication module(s) 306 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 318 may be any type of connector used for physically interfacing with a smartphone and/or a portable computing device, such as a mini-USB or USB-C port or an IPHONE®/IPOD® 30-pin connector or LIGHTNING® connector. In other embodiments, the dataport 318 may include multiple communication channels for simultaneous communication with, for example, other processors, servers, and/or client terminals.

The memory 304 may store instructions for communicating with other systems, such as a computer. The memory 304 may store, for example, a program (e.g., computer program code) adapted to direct the processor(s) 302 in accordance with the present embodiments. The instructions also may include program elements, such as an operating system. While execution of sequences of instructions in the program causes the processor(s) 302 to perform the process steps described herein, hard-wired circuitry may be used in place of, or in combination with, software/firmware instructions for implementation of the processes of the present embodiments. Thus, the present embodiments are not limited to any specific combination of hardware and software.

The input device(s) 310 may include any combination of hardware and/or software elements that receive user input and/or facilitate the interpretation of received input. Input device(s) 310 may be hardware (e.g., physical buttons and switches), software (e.g., virtual buttons, sliders, etc.), or some combination thereof (e.g., software-controlled haptic feedback for simulating button clicks). In some instances, input device(s) 310 includes a touchscreen or touch-based digitizer. Input device(s) 310 may include a virtual keyboard or other virtual input elements as well.

The speaker(s) 312 may include any combination of speakers or other sound-emitting devices. The speaker(s) 312 may be operable to produce a variety of sounds, such as audio from live video, notification or alert sounds, or other audible sounds.

The microphone(s) 314 may include any combination of transducers that convert pressure waves into electrical signals. The microphone(s) 314 may capture audio, which may, in some instances, be transmitted to a separate computing device or server. That transmitted audio may then be relayed to an A/V recording and communication device 200 (e.g., to provide a substantially live audio transmission to a video doorbell).

The antenna 316 may enable the client device 300 to communicate wirelessly. For instance, the antenna 316 permits the client device 300 to communicate over cellular networks, via one or more communication standards (e.g., GSM, CDMA, LTE, etc.). The antenna 316 may allow the client device 300 to communicate over other wireless protocols, such as Wi-Fi or Bluetooth, among other wireless protocols. The antenna 316 may include multiple antennae, depending on the particular implementation.

In addition to the above, the client device 300 may include a variety of other components, such as batteries, connectors, light indicators, cameras, and sensors, among other components.

Figure 4:
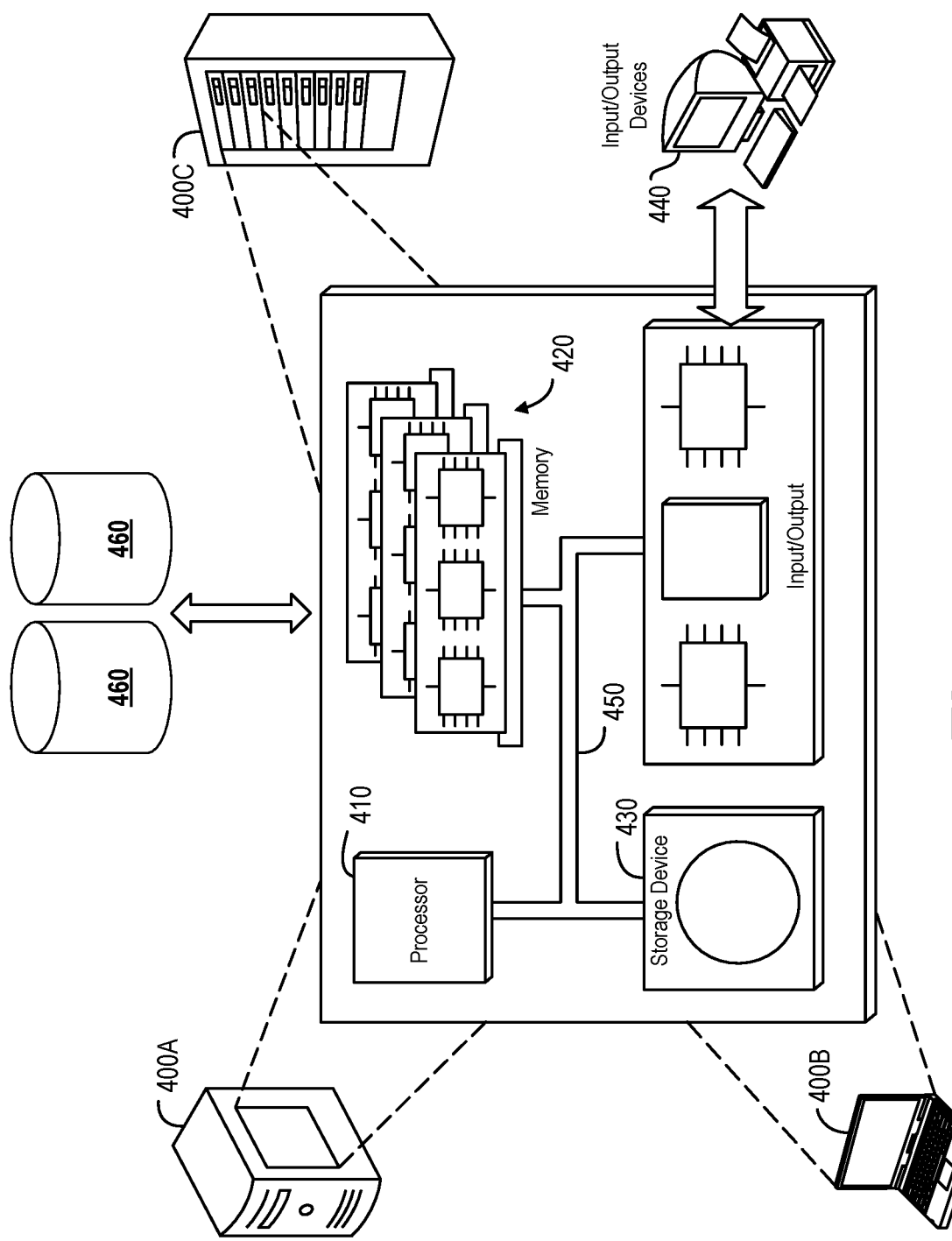
FIG. 4 is a functional block diagram of a general-purpose computing system on which the present embodiments may be implemented according to various aspects of present disclosure.

FIG. 4 is a functional block diagram of a general-purpose computing system on which the present embodiments may be implemented according to various aspects of the present disclosure. The computer system 400 may be embodied in at least one of a personal computer (also referred to as a desktop computer) 400A, a portable computer (also referred to as a laptop or notebook computer) 400B, and/or a server 400C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 400 may execute at least some of the operations described above. The computer system 400 may include at least one processor 410, memory 420, at least one storage device 430, and input/output (I/O) devices 440. Some or all of the components 410, 420, 430, 440 may be interconnected via a system bus 450. The processor 410 may be single- or multi-threaded and may have one or more cores. The processor 410 may execute instructions, such as those stored in the memory 420 and/or in the storage device 430. Information may be received and output using one or more I/O devices 440.

The memory 420 may store information, and may be a computer-readable medium, such as volatile or non-volatile memory. The storage device(s) 430 may provide storage for the system 400, and may be a computer-readable medium. In various aspects, the storage device(s) 430 may be a flash memory device, a hard disk device, an optical disk device, a tape device, or any other type of storage device.

The I/O devices 440 may provide input/output operations for the system 400. The I/O devices 440 may include a keyboard, a pointing device, and/or a microphone. The I/O devices 440 may further include a display unit for displaying graphical user interfaces, a speaker, and/or a printer. External data may be stored in one or more accessible external databases 460.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Figure 5A:
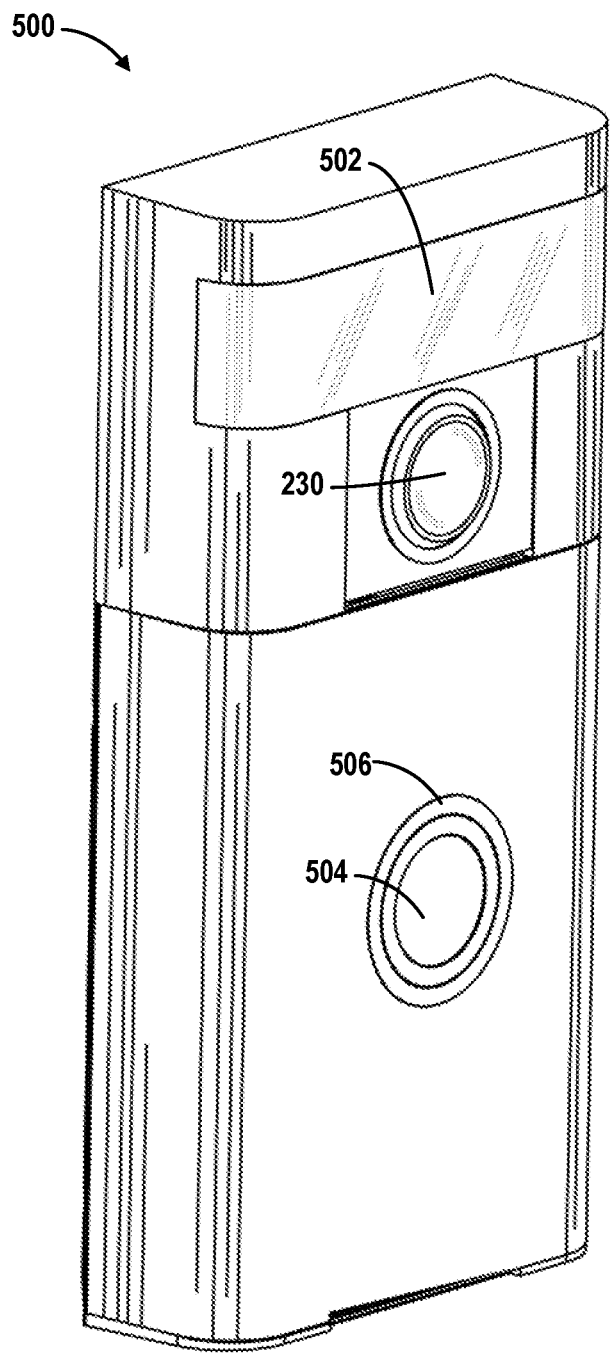
FIGS. 5A-5C depict example A/V recording and communication devices according to various aspects of the present disclosure.
Figure 5B:
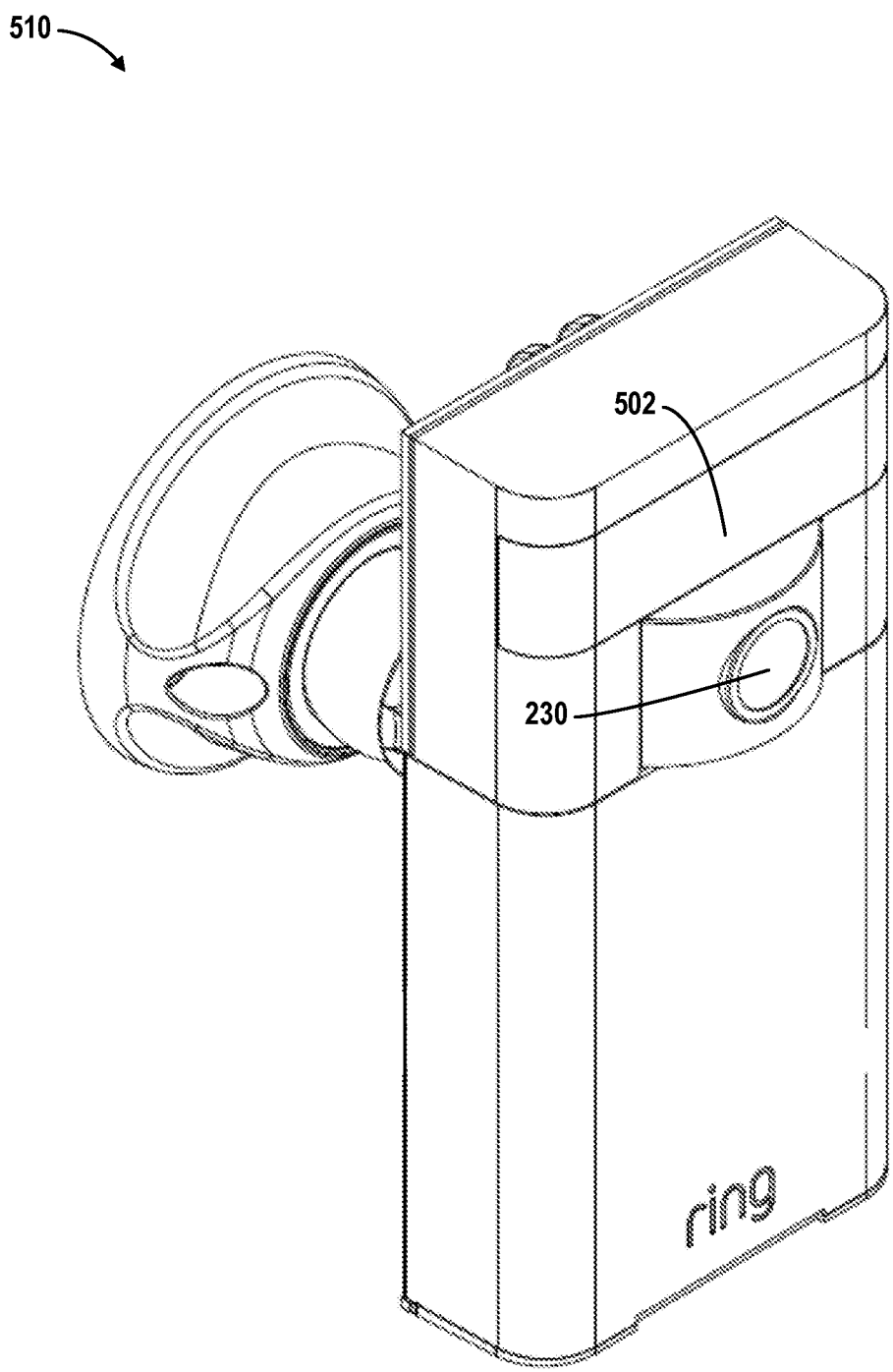
Figure 5C:
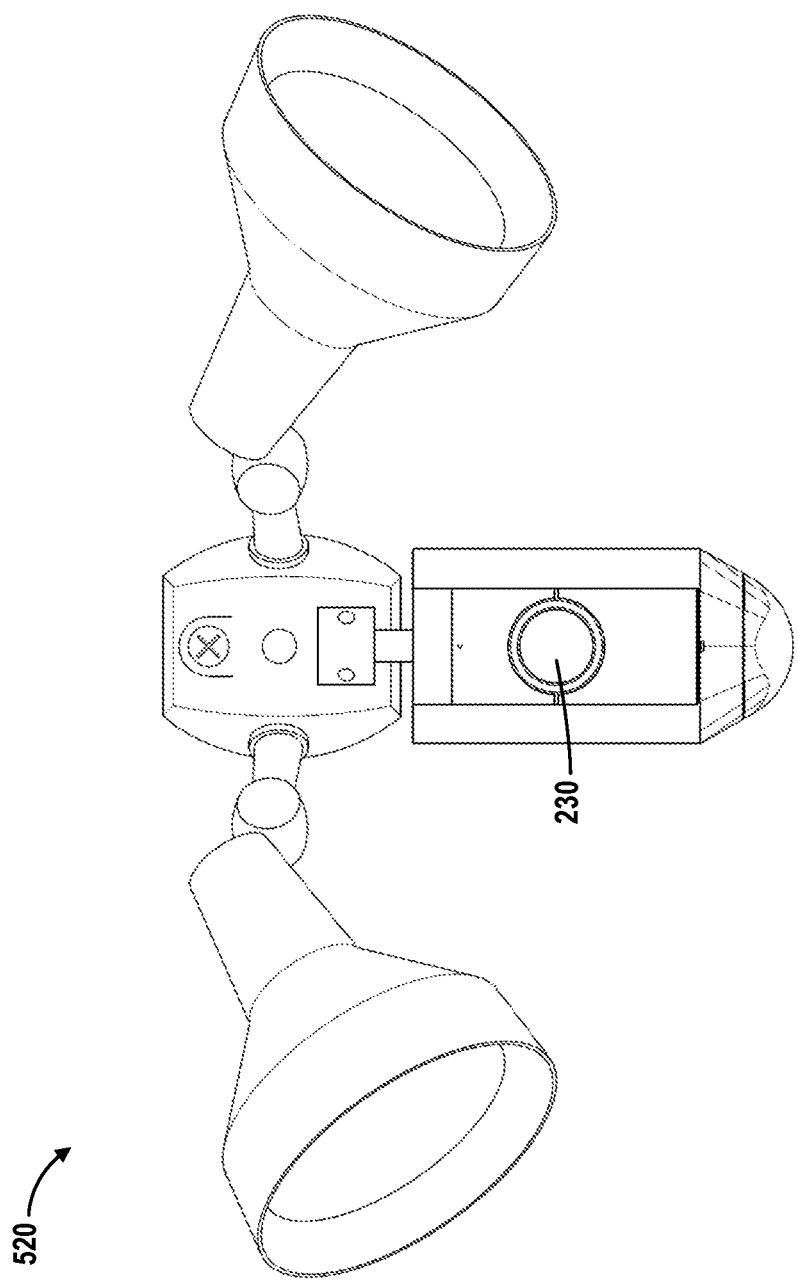

FIGS. 5A, 5B and 5C depict example A/V recording and communication devices 500, 510, 520. A/V recording and communication device 500 (FIG. 5A) may be referred to herein as a "video doorbell" or some variant thereof. A/V recording and communication device 510 (FIG. 5B) may be referred to herein as a "security cam" or some variant thereof. A/V recording and communication device 520 (FIG. 5C) may be referred to herein as the "floodlight cam," "spotlight cam," or some variant thereof. The A/V recording and communication devices 500, 510, 520 may be embodiments of the A/V recording and communication device 200 described with respect to FIG. 2 and thus may each include some or all of the elements of A/V recording and communication device 200. The A/V recording and communication devices 500, 510, 520 may also include additional hardware and/or software elements not explicitly contemplated in the present disclosure. Although FIGS. 5A-5C illustrate example A/V recording and communication device implementations, other form factors, shapes, mounting hardware, arrangement of components, or aesthetic aspects may be used without departing from the scope of the present disclosure.

Each of the video doorbell 500, the security cam 510, and the floodlight cam 520 may include a camera 230 that captures video data when activated. At least the video doorbell 500 and the security cam 510 may further include a lens 502. In some embodiments, the lens 502 may comprise a Fresnel lens, which may be patterned to deflect incoming light into one or more infrared sensors located within the video doorbell 500 or the security cam 510 (e.g., the passive infrared sensors 226 (FIG. 2)).

The video doorbell 500 may further include a button 504 and a light pipe 506. The button 504 may make contact with a button actuator (not shown) located within the video doorbell 500 when the button 504 is pressed by a visitor. When pressed, the button 504 may trigger one or more functions of the doorbell 500, such as sounding an audible alert, transmitting a notification to a user, etc. The light pipe 506 may allow light produced within the doorbell 500 (e.g., by the light source(s) 224 (FIG. 2)) to pass through.

In various embodiments, one or more A/V recording and communication devices 200 may be installed at a location, and may also be associated with a security system deployed at the location and controlled, for example, via a communication hub 116 and/or a backend server 124. An A/V recording and communication device 200 may be known to be associated with a particular user, user account, and/or user client device 300 based on a cross-listing stored at a local device (e.g., the communication hub 116) and/or at a back-end server or network (e.g. the backend server 124).

Figure 6:
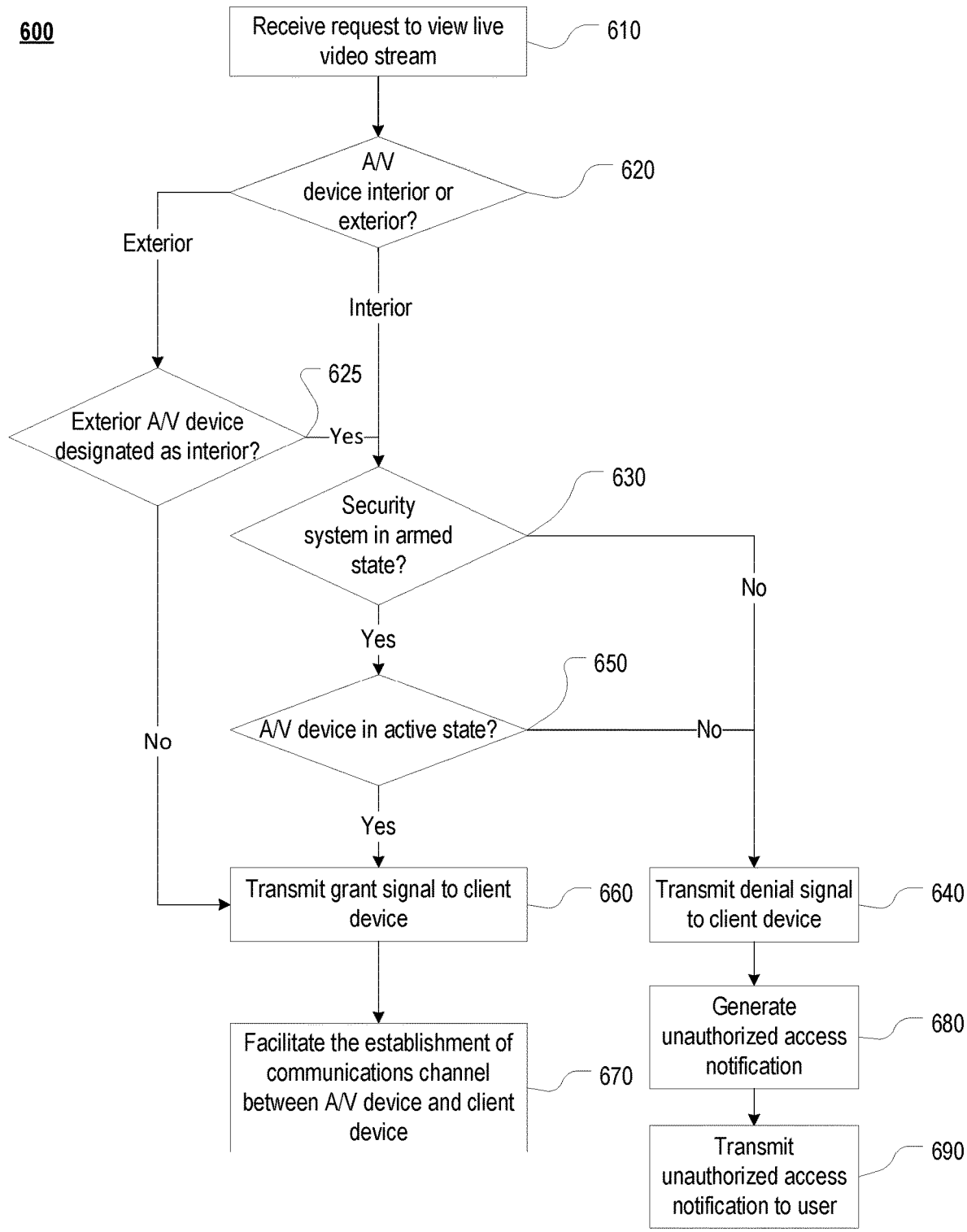
FIG. 6 is a flowchart of a process for controlling access by a client device to a live stream of an A/V recording and communication device, in accordance with various aspects of the present disclosure.

In some embodiments, access to a live video stream of the A/V recording and communication device 200 may be controlled based on the state of a security system deployed at the location of the A/V recording and communication device 200 and/or the state of the A/V recording and communication device 200. FIG. 6 is a flowchart of a process 600 for controlling access by a client device 300 to a live stream of an A/V recording and communication device 200, such as a video doorbell 510, a security cam 520, or a floodlight cam 530, in accordance with various aspects of the present disclosure. The process 600 may be described herein as being implemented by, for example, a backend server 124 that is communicatively coupled with the A/V recording and communication device 200, but it will be appreciated that the process 600 can be implemented by other devices (e.g., a local device such as the communication hub 116). At block 610, a request to view a live video stream of the A/V recording and communication 200 is received from a client device 300. In some embodiments, the process 600 may distinguish between A/V recording and communication devices 200 installed in the interior of a location versus those installed on the exterior, because there may be less of a concern with hacking and spying in relation to external devices. Similarly, the process 600 may also distinguish between A/V recording and communication devices installed on the exterior of a location that have a field of view that includes the interior of a structure (e.g., a house) at the location versus those that do not. In such cases, externally-installed A/V recording and communication devices with views into an interior of a location may be designated as interior devices. For example, a user may designate the device as an interior device through a web-based portal or mobile app, through the communication hub 116, or via an onboard switch on the A/V recording and communication device 200. Accordingly, at block 620, a determination may be made as to whether the A/V recording and communication device 200 is an interior device or an exterior device. If the A/V recording and communication device 200 is an exterior device, then the process 600 may proceed to block 625, where a further determination is made as to whether the exterior device is nevertheless designated as an interior device (e.g., because it has a view into the interior of a structure at the location). If not, then the process 600 may proceed to block 660, where a grant signal is transmitted to the client device 300. The backend server may then facilitate the establishment of a communications channel between the A/V recording and communication device 200 and the client device 300 (block 670), so that the client device 300 may access the live stream of the A/V recording and communication device 200.

With reference again to decision blocks 620 and 625, if the A/V recording and communication device 200 is determined to be an interior device, or if the A/V recording and communication device 200 is an exterior device but is nevertheless designated as an interior device, then the process 600 proceeds to block 630, where a determination is made as to whether a security system deployed at the location is in an armed state. If the security system is not in an armed state, then it may be desirable to prevent access to the live video feed of the A/V recording and communication device 200, since a disarmed state indicates that the owner of the A/V recording and communication device 200 may be home, and thus viewing a live video feed may be an invasion of privacy. Thus, if the security system is determined to not be in an armed state, then process 600 may proceed to block 640, where a denial signal is transmitted to the client device 300. The backend server 124 may then generate an unauthorized access notification (block 680) and then, at block 690, transmit the unauthorized access notification to the user associated with the A/V recording and communication device 200. The unauthorized access notification may be in the form of, for example, an email, an SMS (short message service) message, a push notification transmitted to a client device 300 associated with the user, or the like. The unauthorized access notification may contain a variety of information, including but not limited to one or more of information identifying the unauthorized client device 300, a MAC address of the unauthorized client device 300, an IP address of the unauthorized client device 300, a name of the unauthorized client device 300, and/or a location of the unauthorized client device 300.

With reference again to block 630, if the security system is determined to be in the armed state, then the process 600 may proceed to block 650, where a further determination is made as to whether the A/V recording and communication device 200 is in an active state. In some embodiments, the security system being in an armed state and the A/V recording and communication device 200 being in an inactive state may correspond to the security system being in an "armed stay" or "armed home" state in which the owner is likely home and the interior cameras are inactive (or disarmed) but exterior cameras are active (or armed). In such cases, it may be desirable to prevent access to the interior (inactive) cameras. Thus, if the A/V recording and communication device 200 is not in an active state, then the process 600 may again proceed to block 640, where a denial signal is transmitted to the client device 300, and, in at least some embodiments, an unauthorized access notification may be generated (block 680) and transmitted to the owner (block 690). If the A/V recording and communication device 200 is determined to be in an active state, then the process 600 may proceed to block 660, where a grant signal is transmitted to the client device 300, and then to block 670, where the establishment of a communications channel between the A/V recording and communication device 200 and the client device 300 is facilitated.

Figure 7:
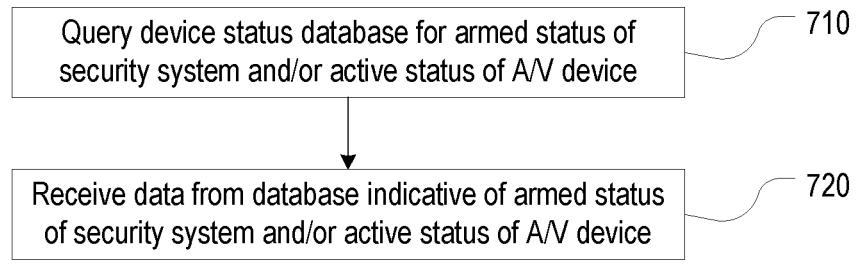
FIG. 7 is a flowchart of a process for determining whether a security system is in an armed state and whether an A/V recording and communication device is in an active state, in accordance with various aspects of the present disclosure.

It should be appreciated that the determinations of whether the security system is in the armed state and whether the A/V recording and communication device is in an active state may be achieved in a number of ways. For example, in some embodiments, the security system, e.g., controlled by communication hub 116, and the A/V recording and communication device may provide updates concerning their respective statuses to a backend server 124. Thus, FIG. 7 illustrates a flowchart of an example process 630A for determining whether a security system is in an armed state and whether an A/V recording and communication device 200 is in an active state, in accordance with such embodiments. At block 710, the backend server 124 may query a device status database, such as one of databases 126, for an armed status of the security system and an active status of the A/V recording and communication device 200. The backend server 124 may then receive data from the database indicative of the armed status of the security system and an active status of the A/V recording and communication device 200 (block 720).

Figure 8:
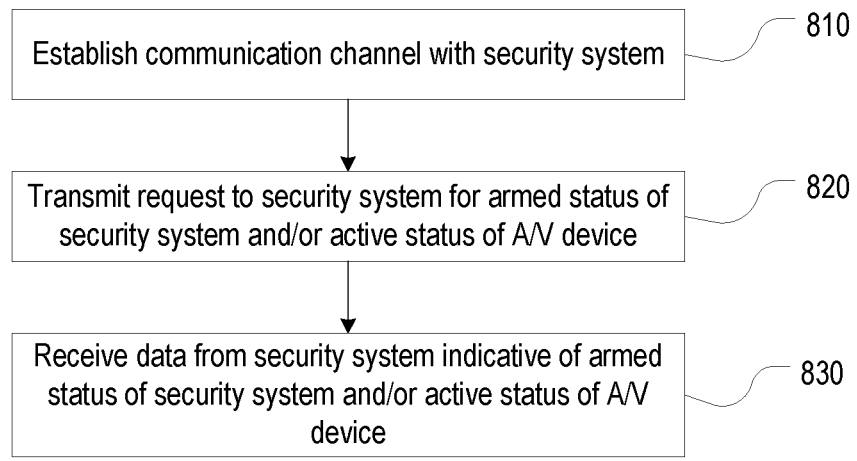
FIG. 8 is a flowchart of another process for determining whether a security system is in an armed state and whether an A/V recording and communication device is in an active state, in accordance with various aspects of the present disclosure.

In other embodiments, a component of the security system, e.g. the communication hub 116, may track or otherwise have direct access to its own status and the status of any A/V recording and communication devices 200 on its network. Thus, FIG. 8 illustrates a flowchart of another example process 630B for determining whether a security system is in an armed state and whether an A/V recording and communication device 200 is in an active state, in accordance with such embodiments. At block 810, a communication channel may be established with the security system. At block 820, a request may be transmitted to the security system for the armed status of the security system and/or the active status of the A/V recording and communication device 200. Then, at block 830, data is received from the security system that is indicative of the armed status of the security system and/or the active status of the A/V recording and communication device 200.

Figure 9:
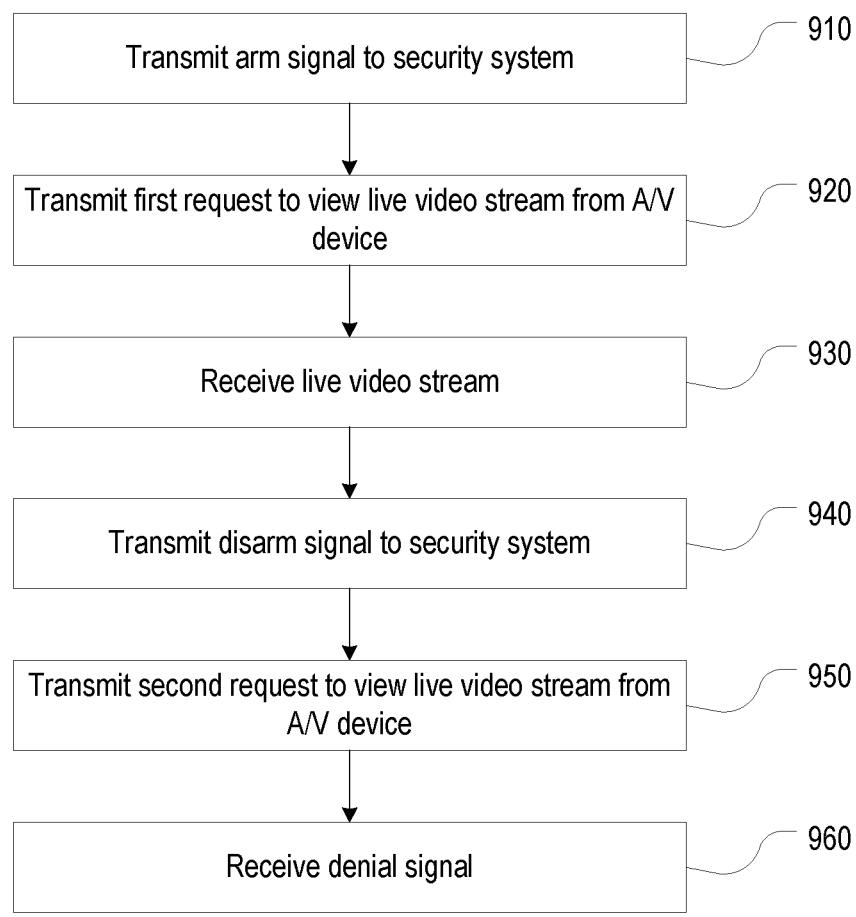
FIG. 9 is a flowchart of a process for streaming a live video stream captured by an A/V recording and communication device, in accordance with various aspects of the present disclosure.

FIG. 9 illustrates a flowchart for a process 900 of streaming a live video stream captured by an A/V recording and communication device 200, in accordance with various aspects of the present disclosure. The process 900 may be described herein as being implemented by, for example, a client device 300 that is communicatively coupled with the A/V recording and communication device 200, but it will be appreciated that the process 900 can be implemented by other devices. At block 910, the client device may transmit an arm signal to a security system deployed at a same location at which the A/V recording and communication device 200 is installed. The security system may correspondingly transition to an armed state responsive to the arm signal (if it was not already in the armed state). At block 920, the client device may transmit a first request to view a live video stream from the A/V recording and communication device 200. The first request may be transmitted, for example, to the communication hub 116 or the backend server 124, or it may be transmitted directly to the A/V recording and communication device. The client device 300 may then receive the live video stream from the A/V recording and communication device 200 at block 930, since the security system is in the armed state. At block 940, the client device may then transmit a disarm signal to the security system, in response to which the security system may enter a disarmed state. The client device may then transmit a second request to view the live video stream from the A/V recording and communication device 200 (block 950). The client device may then receive a denial signal in response to the second request (block 960), since the security system is in the disarmed state.

Figure 10:
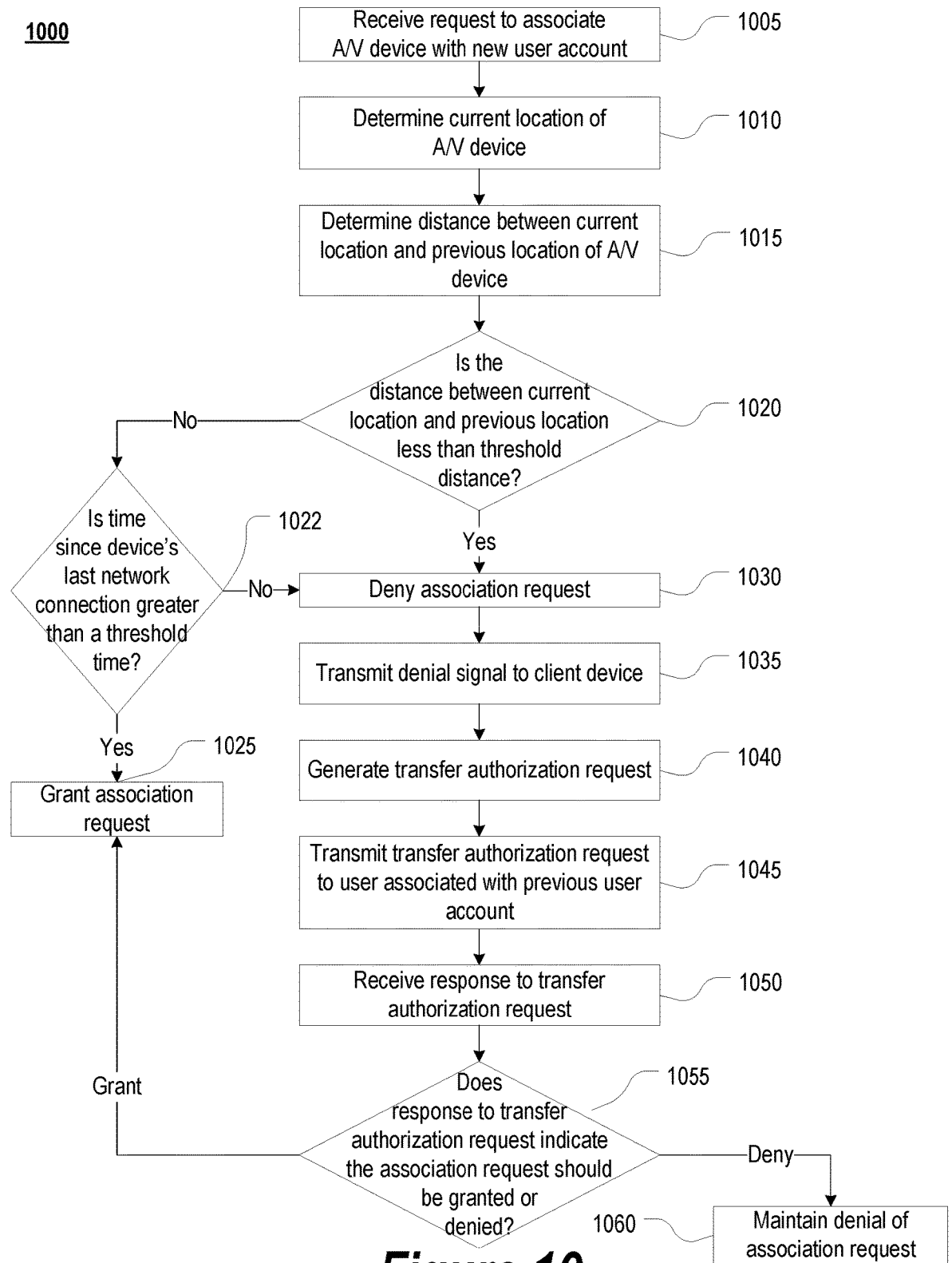
FIG. 10 is a flowchart of a process for controlling access to an A/V recording and communication device based on a location of the A/V recording and communication device, in accordance with various aspects of the present disclosure.

In some embodiments, access to an A/V recording and communication device may controlled based on a location of the A/V recording and communication device 200. In some instances a new user may attempt to gain access to or control of an A/V recording and communication device 200 that was previously, or is currently, associated with a previous user account that is not associated with the new user. Some of those attempts may be legitimate, such as in the case of an A/V recording and communication device 200 being sold in the secondary market to a new owner. However, other such attempts may involve hackers attempting to gain access to the A/V recording and communication device 200, unbeknownst to the current owner, in furtherance of criminal activity. In the latter, illegitimate scenario, the A/V recording and communication device 200 is unlikely to be moved. Accordingly, FIG. 10 illustrates a flowchart of a process 1000 for controlling access to an A/V recording and communication device 200 based on a location of the A/V recording and communication device 200, in accordance with various aspects of the present disclosure. The process 1000 may be described herein as being implemented by, for example, a backend server 124 that is communicatively coupled with the A/V recording and communication device 200, but it will be appreciated that the process 1000 can be implemented by other devices.

At block 1005, the backend server 124 may receive a request from a client device 300 to associate the A/V recording and communication device 200 with a new user account. At block 1010, the backend server 124 may then determine the current location of the A/V recording and communication device 200. That determination may be achieved in a number of ways. For example, in some embodiments, the A/V recording and communication device 200 may have an onboard Global Navigation Satellite System (GNSS) or Global Positioning System (GPS) chip, low-power wide-area network chip, gyroscope, accelerometer, inertial measurement unit, or the like, in which case the backend server 124 can directly query the A/V recording and communication device 200 for its location. In other embodiments, the client device 300 may have an onboard GPS chip, or the like, in which case the backend server 124 can query the client device 300 for its location and then assume that the current location of the A/V recording and communication device 200 is the same. In still other embodiments, the backend server can query the new user, e.g. via a user interface of the client device 300, for the location of the A/V recording and communication device 200. The location of the A/V recording and communication device 200 may comprise, for example, an address and/or other geographic coordinates, such as latitude and longitude.

At block 1015, the backend server determines the distance between the current location and a previous location of the A/V recording and communication device 200. The previous location may be stored, for example, in one or more of the databases 126. The backend server 124 may then determine, at block 1020, whether the distance between the current location and the previous location is less than a threshold distance. In some embodiments, the threshold distance may be a distance that indicates that the A/V recording and communication device 200 has been relocated to a new physical address, as opposed to simply being relocated to a different location at the same address. In some embodiments, the threshold distance may be a static value, such as 100 meters, a quarter-mile, or the like. In other embodiments, the threshold distance may vary based on Geographic Information System (GIS) mapping data that includes information concerning the boundaries of the lot associated with the previous address. If, in block 1020, the distance between the current location and the previous location of the A/V recording and communication device 200 is not determined to be less than the threshold distance (e.g., it is equal to or greater than the threshold distance), then the process 1000 proceeds to block 1022, where a further determination is made as to whether the time since the last network connection of the A/V recording and communication device 200 is greater than a threshold time. The threshold time may be a duration sufficiently long to prevent thieves from quickly re-associating the device with a new account while also being short enough so as not to interfere with most legitimate relocations. For example, the threshold time may be three days, five days, a week, etc. If the time since the last network connection is greater than the threshold time, then the request to associate the A/V recording and communication device 200 with a new user account is deemed to be a legitimate request, and the process 1000 proceeds to block 1025, where the association request is granted (thereby associating the A/V recording and communication device 200 with the new user account). If, on the other hand, either the distance between the current location and the previous location of the A/V recording and communication device 200 is determined to be less than the threshold distance (e.g., because the A/V recording and communication device 200 has not been moved to a new address), or the time since the last network connection is less than the threshold time, then the request to associate the A/V recording and communication device 200 with the new user account is deemed to be an illegitimate request, and the process 1000 proceeds to block 1030, where the association request is denied. The backend server 124 may also transmit a denial signal to the client device 300 (block 1035).

In some embodiments it may be desirable to override a denied association request. For example, an A/V recording and communication device 200 may be sold to a new owner together with the home or building to which it is attached. In such a scenario, it is anticipated that the user account with which the A/V recording and communication device 200 is associated will be changed to one associated with the new owner. Accordingly, at block 1040, after initially denying an association request, the backend server 124 may then generate a transfer authorization request. At block 1045, the transfer authorization request may then be transmitted to the user associated with the previous user account (e.g., the prior owner). The transfer authorization request may permit the prior owner a number of response options, including confirming or overriding the prior denial. Once the prior owner has selected a response option, a response to the transfer authorization request is received at block 1050. At block 1055, a determination is made as to whether the response to the transfer authorization request indicates that the association request should be granted or denied. If the response indicates that the association request should be granted, the process 1000 proceeds to block 1025, where the backend server 124 grants the request. If the response indicates that the association request should be denied, the process 1000 proceeds to block 1060, where the backend server 124 maintains the denial of the association request.

Figure 11:
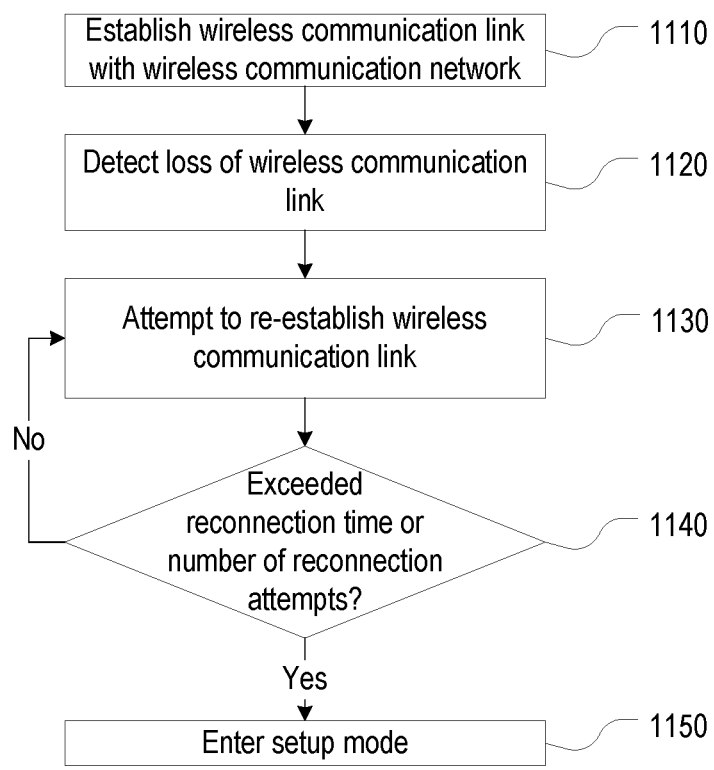
FIG. 11 is a flowchart of a process for establishing a network connection by an A/V recording and communication device, in accordance with various aspects of the present disclosure.

In some embodiments, the A/V recording and communication device 200 may be configured to perform certain operations in the event of a loss of network connection. FIG. 11 is a flowchart of a process 1100 for establishing a network connection by an A/V recording and communication device 200, in accordance with various aspects of the present disclosure. At block 1110, the A/V recording and communication device 200 establishes a wireless communication link with a wireless communication network, such as a user's network 110. Subsequently, at block 1120, the A/V recording and communication device 200 may detect a loss of the wireless communication link. Upon detecting such a loss, at block 1130, the A/V recording and communication device 200 may attempt to re-establish the wireless communication link. In some embodiments, the A/V recording and communication device 200 may repeat block 1130 for a certain duration ("reconnection time") or a certain number of times ("reconnection attempts"). Accordingly, at block 1140, a determination is made as to whether the reconnection time or the number of reconnection attempts (as the case may be) has been exceeded. If not, the process 1100 repeats blocks 1130 and 1140. If yes, then the process 1100 proceeds to block 1150 where the A/V recording and communication device 200 enters into a "setup" mode in which it can be configured by another device.

Figure 12:
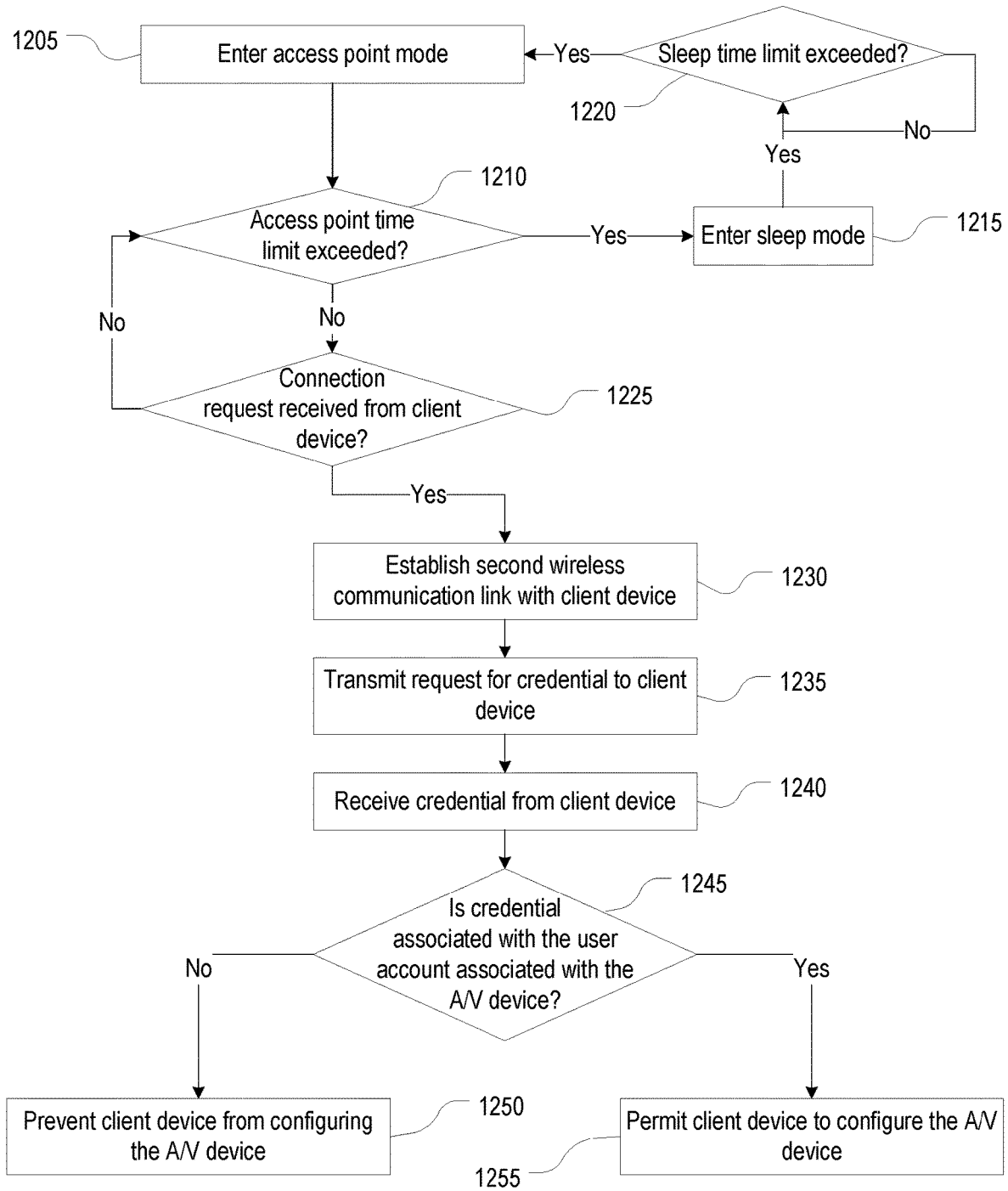
FIG. 12 is a flowchart of a process for implementing a setup mode in an A/V recording and communication device, in accordance with various aspects of the present disclosure.

It should be appreciated that the setup mode may be implemented in a number of ways. For example, FIG. 12 illustrates a flowchart of a process 1150A for implementing a setup mode in an A/V recording and communication device 200, in accordance with various aspects of the present disclosure. At block 1205, the A/V recording and communication device 200 enters an access point mode in which the A/V recording and communication device 200 functions (e.g., broadcasts) as a wireless access point (WAP) to which other wireless communication devices, such as a client device 300, may wirelessly connect. In some embodiments, particularly those in which the A/V recording and communication device 200 is powered by a rechargeable battery, the A/V recording and communication device 200 may alternate between the access point mode and a sleep mode in which the A/V recording and communication device 200 ceases functioning as a WAP and conserves power. Accordingly, at block 1210, a determination is made as to whether the A/V recording and communication device 200 has exceeded an access point time limit. If it has, then the A/V recording and communication device 200 enters a sleep mode (block 1215) for a period of time until a sleep time limit is exceeded. When the sleep time limit has been exceeded (block 1220), the A/V recording and communication device 200 then returns to the access point mode (block 1205), and so on. If, at block 1210, the access point time limit has not been exceeded, the A/V recording and communication device 200 determines whether a connection request has been received (block 1225) from a client device 300. If not, the process 1150A repeats blocks 1210 and 1225 until either the access point time limit has been exceeded or a connection request is received. If a connection request is received from a client device 300, the process 1150A proceeds to block 1230 where the A/V recording and communication device 200 establishes a second wireless communication link with the client device 300. At block 1235, the A/V recording and communication device 200 then transmits a request for a credential to the client device. The A/V recording and communication device 200 may then receive a credential back from the client device 300 at block 1240 and then, at block 1245, determine whether the credential is associated with the user account associated with the A/V recording and communication device 200. If yes, the process 1150A proceeds to block 1255, where the A/V recording and communication device 200 permits the client device 300 to configure the A/V recording and communication device 200 (e.g., to connect to a different wireless network). If no, the process 1150A proceeds to block 1250, where the client device 300 is prevented from configuring the A/V recording and communication device 200.

The various embodiments of the present disclosure for preventing unauthorized access to audio/video recording and communication devices have several features, no single one of which is solely responsible for their desirable attributes. Without limiting the scope of the present embodiments as expressed by the claims that follow, their more prominent features now will be discussed briefly.

One aspect of the present embodiments includes the realization that criminals or the like may attempt to gain unauthorized access to A/V recording and communication devices, for example, to gain access to an A/V stream of the A/V recording and communication device, e.g., to spy on the owner. The present embodiments solve this problem by leveraging the functionality of A/V recording and communication devices, such as A/V recording and communication doorbells and surveillance cameras, to reduce the potential for gaining unauthorized access. For example, in instances where the A/V recording and communication device is associated with a security system, the A/V recording and communication device may only permit access to its live stream when certain conditions are met, such as the security system being in an armed mode and/or the A/V recording and communication device being in an active state. In other cases, if a new user (e.g., a hacker) is attempting to gain access to the A/V recording and communication device, the device and/or backend system may first check the physical location of the device, and if the device did not move more than a threshold distance, then the access request may be denied. Such a distinction based on distance moved would help differentiate between unauthorized hackers, who are unlikely to move the device, and authorized new owners, who are likely to relocate the device to a distinct address.

In a first aspect, a method for controlling access to a live video stream of an audio/video (A/V) recording and communication device deployed at a location is provided. The method includes receiving a request to view the live video stream from a client device, determining whether a security system deployed at the location is in an armed state, determining whether the A/V recording and communication device is in an active state, and transmitting to the client device a grant signal indicating that the request has been granted, or a denial signal indicating that the request has been denied, based on the determination of whether the security system is in the armed state and the determination of whether the A/V recording and communication device is in the active state.

In an embodiment of the first aspect, transmitting to the client device the grant signal indicating that the request has been granted, or the denial signal indicating that the request has been denied, based on the determination of whether the security system is in the armed state and the determination of whether the A/V recording and communication device is in the active state includes transmitting to the client device the denial signal based on a determination that the security system is not in the armed state.

In another embodiment of the first aspect, transmitting to the client device the grant signal indicating that the request has been granted, or the denial signal indicating that the request has been denied, based on the determination of whether the security system is in the armed state and the determination of whether the A/V recording and communication device is in the active state includes transmitting to the client device the denial signal based on a determination that the security system is in the armed state and the A/V recording and communication device is not in the active state.

In another embodiment of the first aspect, transmitting to the client device the grant signal indicating that the request has been granted, or the denial signal indicating that the request has been denied, based on the determination of whether the security system is in the armed state and the determination of whether the A/V recording and communication device is in the active state includes transmitting to the client device the grant signal based on a determination that the security system is in the armed state and the A/V recording and communication device is in the active state.

In another embodiment of the first aspect, determining whether the security system deployed at the location is in the armed state and determining whether the A/V recording and communication device is in the active state includes querying a device status database for an armed status of the security system and an active status of the A/V recording and communication device and receiving data from the database indicative of the armed status of the security system and the active status of the A/V recording and communication device.

In another embodiment of the first aspect, determining whether the security system deployed at the location is in the armed state and determining whether the A/V recording and communication device is in the active state includes establishing a communications channel with the security system, transmitting, to the security system, a request for an armed status of the security system and a request for an active status of the A/V recording and communication device, and responsive to the request for the armed status and the request for the active status, receiving data from the security system indicative of the armed status and the active status.

In another embodiment of the first aspect, the method further includes facilitating the establishment of a communications channel between the A/V recording and communication device and the client device to enable the client device to stream the live video stream, when the security system is determined to be in the armed state and the A/V recording and communication device is determined to be in the active state.

In another embodiment of the first aspect, the method further includes generating an unauthorized access notification based on the request to view the live video stream when the security system is determined not to be in the armed state or the A/V recording and communication device is determined not to be in the active state and transmitting the notification to a user associated with the A/V recording and communication device.

In another embodiment of the first aspect, the unauthorized access notification is an email.

In another embodiment of the first aspect, the unauthorized access notification is an SMS message.

In another embodiment of the first aspect, the client device is a first client device, the unauthorized access notification is a push notification, and transmitting the notification to the user associated with the A/V recording and communication device includes transmitting the push notification to a second client device associated with the user.

In another embodiment of the first aspect, the unauthorized access notification includes information identifying the client device.

In another embodiment of the first aspect, the information identifying the client device includes one or more of a MAC address of the client device, an IP address of the client device, a name of the client device, or a location of the client device.

In another embodiment of the first aspect, the method is implemented at a backend server.

In a second aspect, a method of streaming a live video stream captured by an audio/video (A/V) recording and communication device installed at a location is provided. The method includes transmitting, by a client device, an arm signal to a security system deployed at the location, where the security system assumes an armed state responsive to the arm signal. The method also includes transmitting, by the client device while the security system is in the armed state, a first request to view the live video stream from the A/V recording and communication device; receiving, by the client device, the live video stream; transmitting, by the client device, a disarm signal to the security system, where the security system assumes a disarmed state responsive to the disarm signal. The method also includes transmitting, by the client device while the security system is in the disarmed state, a second request to view the live video stream from the A/V recording and communication device, and receiving, by the client device, a denial signal indicating that the second request has been denied.

In a third aspect, a non-transitory, computer-readable medium is provided which includes stored thereon instructions that, when executed by a processing device of a client device, cause the client device to perform the method of the second aspect.

In a fourth aspect, a method for controlling access to an audio/video (A/V) recording and communication device installed at a current location is provided. The method includes receiving, from a client device, a request to associate the A/V recording and communication device with a new user account, where the A/V recording and communication device was previously or is currently associated with a previous user account that is different from the new user account. The method also includes determining the current location of the A/V recording and communication device, determining a distance between the current location and a previous location of the A/V recording and communication device, where the previous location is associated with the previous user account. The method also includes comparing the distance between the current location and the previous location to a threshold distance and denying the request to associate the A/V recording and communication device with the new user account when the distance between the current location and the previous location is less than the threshold distance.

In an embodiment of the fourth aspect, the method further includes transmitting, to the client device, a denial signal indicating that the request has been denied when the distance between the current location and the previous location is less than the threshold distance.

In another embodiment of the fourth aspect, the request is an association request and the method further includes, after denying the association request, generating a transfer authorization request based on the association request, where the transfer authorization request requests confirmation from a user associated with the previous user account that the request to associate the A/V recording and communication device with a new user account is authorized. The method further includes transmitting the transfer authorization request to the user associated with the previous user account.

In another embodiment of the fourth aspect, the method further includes receiving a response to the transfer authorization request from the user associated with the previous user account and granting or further denying the request to associate the A/V recording and communication device with the new user account in accordance with the response to the transfer authorization request.

In another embodiment of the fourth aspect, granting or further denying the request to associate the A/V recording and communication device with the new user account in accordance with the response to the transfer authorization includes associating the A/V recording and communication device with the new user account when the response to the transfer authorization request indicates that the request to associate the A/V recording and communication device with the new user account is authorized.

In another embodiment of the fourth aspect, granting or further denying the request to associate the A/V recording and communication device with the new user account in accordance with the response to the transfer authorization request includes further denying the request to associate the A/V recording and communication device with the new user account when the response to the transfer authorization request indicates that the request to associate the A/V recording and communication device with the new user account is not authorized.

In another embodiment of the fourth aspect, determining the current location of the A/V recording and communication device includes transmitting, to at least one of the client device or the A/V recording and communication device, a request for the current location of the A/V recording and communication device, and receiving, from the at least one of the client device or the A/V recording and communication device, an indication of the current location of the A/V recording and communication device.

In another embodiment of the fourth aspect, the indication of the current location of the A/V recording and communication device includes one or more of an address associated with the current location or geographic coordinates of the A/V recording and communication device.

In another embodiment of the third aspect, the method is implemented at a backend server.

In a fifth aspect, a method for obtaining access to an audio/video (A/V) recording and communication device installed at a current location is provided. The method includes transmitting, by a client device to a server, a request to associate the A/V recording and communication device with a new user account, where the A/V recording and communication device was previously associated with a previous location and a previous user account that is different from the new user account. The method also includes receiving, by the client device from the server, a denial signal indicating that the request has been denied when the current location is less than a predetermined threshold distance from the previous location.

In an embodiment of the fifth aspect, the method further includes receiving, by the client device from the server, a grant signal indicating that the request has been granted when the current location is more than a predetermined threshold distance from the previous location.

In another embodiment of the fifth aspect, the method further includes receiving from the server a request for the current location of the A/V recording and communication device and transmitting an indication of the current location of the A/V recording and communication device to the server.

In another embodiment of the fifth aspect, the method further includes determining geographic coordinates of the client device and transmitting to the server the geographic coordinates as the current location of the A/V recording and communication device.

In another embodiment of the fifth aspect, the method further includes generating a graphical user interface requesting entry of an address of the current location, receiving, via the graphical user interface, an indication of the address, and transmitting the address to the server as the current location of the A/V recording and communication device.

In a sixth aspect an audio/video (A/V) recording and communication device including a processor and a wireless transceiver establishes a wireless communication link with a wireless communication network, detects a loss of the wireless communication link, attempts to re-establish the wireless communication link with the wireless communication network, and upon a failure to re-establish the wireless communication link with the wireless communication network, enters a setup mode in which the A/V recording and communication device permits configuration thereof via direct communication with a client device.

In an embodiment of the sixth aspect, attempting to re-establish the wireless communication link with the wireless communication network includes attempting to re-establish the wireless communication link with the wireless communication network for a predetermined amount of time, and entering the setup mode upon the failure to re-establish the wireless communication link with the wireless communication network includes entering the setup mode upon failing to re-establish the wireless communication link with the wireless communication network within the predetermined amount of time.

In another embodiment of the sixth aspect, attempting to re-establish the wireless communication link with the wireless communication network includes attempting to re-establish the wireless communication link with the wireless communication network for a predetermined number of times, and entering the setup mode upon the failure to re-establish the wireless communication link with the wireless communication network includes entering the setup mode upon failing to re-establish the wireless communication link with the wireless communication network the predetermined number of times.

In another embodiment of the sixth aspect, entering the setup mode includes entering into an access point mode in which the A/V recording and communication device broadcasts as a wireless access point.

In another embodiment of the sixth aspect, the A/V recording and communication device is associated with a user account, the wireless communication link is a first wireless communication link, and the A/V recording and communication device establishes a second wireless communication link with a client device while in the access point mode, transmits a request for a credential to the client device, receives the credential from the client device, determines whether the credential is associated with the user account, and selectively permits the client device to proceed with configuring the A/V recording and communication device based on whether the credential is associated with the user account.

In another embodiment of the sixth aspect, selectively permitting the client device to proceed with configuring the A/V recording and communication device based on whether the credential is associated with the user account includes permitting the client device to proceed with configuring the A/V recording and communication device when the credential is associated with the user account and preventing the client device from configuring the A/V recording and communication device when the credential is not associated with the user account.

In another embodiment of the sixth aspect, entering the setup mode includes alternating between an access point mode in which the A/V recording and communication device broadcasts as a wireless access point and a sleep mode in which the A/V recording and communication device temporarily ceases broadcasting and consumes less power than when in the access point mode.

In a seventh aspect, an audio/video (A/V) recording and communication device is provided that includes a camera, a processor, a wireless transceiver adapted to communicatively couple the A/V recording and communication device to a wireless communication network, and a memory storing instructions operable by the processor for performing the method of the sixth aspect and its various embodiments.

In an eighth aspect, a non-transitory, computer-readable medium is provided having stored thereon instructions that, when executed by a processing device of a client device, cause the client device to perform a method for obtaining access to an audio/video (A/V) recording and communication device installed at a current location. The method includes transmitting, by the client device to a server communicatively coupled with the communications network, a request to associate the A/V recording and communication device with a new user account, where the A/V recording and communication device was previously associated with a previous location and a previous user account that is different from the new user account. The method also includes receiving, by the client device from the server, a denial signal indicating that the request has been denied when the current location is less than a predetermined threshold distance from the previous location.

In an embodiment of the eighth aspect, the method further includes receiving, by the client device from the server, a grant signal indicating that the request has been granted when the current location is more than a predetermined threshold distance from the previous location.

In another embodiment of the eighth aspect, the method further includes receiving from the server a request for the current location of the A/V recording and communication device and transmitting an indication of the current location of the A/V recording and communication device to the server.

In another embodiment of the eighth aspect, the method further includes determining geographic coordinates of the client device and transmitting to the server the geographic coordinates as the current location of the A/V recording and communication device.

In another embodiment of the eighth aspect, the method further includes generating a graphical user interface requesting entry of an address of the current location, receiving, via the graphical user interface, an indication of the address, and transmitting the address to the server as the current location of the A/V recording and communication device.

As described above, the present embodiments provide for more secure A/V recording and communication devices. By leveraging the architecture and methodology disclosed herein, various embodiments can reduce the unauthorized access to the video streams of A/V recording and communication devices, as well as to the control of such A/V recording and communication devices. Those capabilities in turn protect users' privacy, reduce crime, and increase public safety.

While various aspects and implementations have been disclosed herein, other aspects and implementations will be apparent to those skilled in the art. The present embodiments are susceptible to modifications and alternate constructions from those discussed above. Consequently, the present invention is not limited to the particular embodiments disclosed. Rather, numerous modifications and alternate constructions fall within the spirit and scope of the present disclosure. For example, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined. The steps in the processes described herein need not be performed in the same order as they have been presented, and may be performed in any order(s), unless logic dictates a particular order. Further, steps that have been presented as being performed separately may in alternative embodiments be performed concurrently. Likewise, steps that have been presented as being performed concurrently may in alternative embodiments be performed separately. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method for controlling access to an audio/video (A/V) recording and communication device ("A/V device") installed at a current location, the method comprising:
   receiving, from a client device, a request to associate the A/V device with a new user account, wherein the A/V device was previously or is currently associated with a previous user account that is different from the new user account;
   determining the current location of the A/V device;
   determining a distance between the current location and a previous location of the A/V device, the previous location being associated with the previous user account;
   comparing the distance between the current location and the previous location to a threshold distance;
   determining that the distance between the current location and the previous location is less than the threshold distance; and
   as a result of the determining that the distance between the current location and the previous location is less than the threshold distance, denying the request to associate the A/V device with the new user account.

2. The method of claim 1, further comprising transmitting, to the client device, a denial signal indicating that the request has been denied.

3. The method of claim 1, wherein the request is an association request and the client device is a first client device, the method further comprising:
   after denying the association request, generating a transfer authorization request, wherein the transfer authorization request requests confirmation from a user associated with the previous user account that the request to associate the A/V device with a new user account is authorized; and
   transmitting the transfer authorization request to a second client device associated with the previous user account.

4. The method of claim 3, further comprising:
   receiving a response to the transfer authorization request from the second client device associated with the previous user account, the response indicating that the request to associate the A/V device with the new user account is authorized; and
   granting the request to associate the A/V device with the new user account.

5. The method of claim 4, further comprising associating the A/V device with the new user account.

6. The method of claim 1, wherein determining the current location of the A/V device comprises:
   transmitting, to at least one of the client device or the A/V device, a request for the current location of the A/V device; and
   receiving, from the at least one of the client device or the A/V device, an indication of the current location of the A/V device.

7. The method of claim 6, wherein the indication of the current location of the A/V device comprises one or more of an address associated with the current location or geographic coordinates of the A/V device.

8. The method of claim 1, wherein the method is implemented at a backend server.

9. A non-transitory, computer-readable medium having stored thereon instructions that, when executed by a processing device of a client device, cause the client device to perform a method for obtaining access to an audio/video (A/V) recording and communication device installed at a current location, the method comprising:
   transmitting, by the client device to a server communicatively coupled with the communications network, a request to associate the A/V recording and communication device with a new user account, wherein the A/V recording and communication device was previously associated with a previous location and a previous user account that is different from the new user account; and receiving, by the client device from the server, a denial signal indicating that the request has been denied when the current location is less than a predetermined threshold distance from the previous location.

10. The non-transitory, computer-readable medium of claim 9, wherein the method further comprises:

receiving, by the client device from the server, a grant signal indicating that the request has been granted when the current location is more than a predetermined threshold distance from the previous location.

11. The non-transitory, computer-readable medium of claim 9, wherein the method further comprises:

receiving from the server a request for the current location of the A/V recording and communication device; and transmitting an indication of the current location of the A/V recording and communication device to the server.

12. The non-transitory, computer-readable medium of claim 11, wherein the method further comprises:

determining geographic coordinates of the client device; and transmitting to the server the geographic coordinates as the current location of the A/V recording and communication device.

13. The non-transitory, computer-readable medium of claim 11, wherein the method further comprises:

generating a graphical user interface requesting entry of an address of the current location;

receiving, via the graphical user interface, an indication of the address; and transmitting the address to the server as the current location of the A/V recording and communication device.

\* \* \* \* \*